(12) United States Patent
Deo et al.

(10) Patent No.: US 7,024,450 B1
(45) Date of Patent: Apr. 4, 2006

(54) METHOD AND APPARATUS FOR DEPLOYING SERVICE MODULES AMONG SERVICE NODES DISTRIBUTED IN AN INTELLIGENT NETWORK

(75) Inventors: Ajay P. Deo, Lewisville, TX (US); Andrew Dugan, Superior, CO (US); Allen Holmes, Colorado Springs, CO (US); Kelvin R. Porter, Dallas, TX (US); Terence A. Robb, Colorado Springs, CO (US)

(73) Assignee: MCI, Inc., Ashburn, VA (US)

( * ) Notice: Subject to any disclaimer, the term of this patent is extended or adjusted under 35 U.S.C. 154(b) by 0 days.

(21) Appl. No.: 09/421,590

(22) Filed: Oct. 20, 1999

(Under 37 CFR 1.47)

Related U.S. Application Data

(63) Continuation-in-part of application No. 09/128,937, filed on Aug. 5, 1998, now Pat. No. 6,418,461.
(60) Provisional application No. 60/104,890, filed on Oct. 20, 1998, and provisional application No. 60/061,173, filed on Oct. 6, 1997.

(51) Int. Cl.
*H04M 3/42* (2006.01)

(52) U.S. Cl. .............. 709/203; 709/201; 709/223; 709/224

(58) Field of Classification Search ......... 709/200–203, 709/219, 223–229; 379/201, 207, 210, 216; 713/200–202; 370/466–468
See application file for complete search history.

(56) References Cited

U.S. PATENT DOCUMENTS

| 5,168,515 | A | | 12/1992 | Grechter et al. | |
|---|---|---|---|---|---|
| 5,742,668 | A | | 4/1998 | Pepe et al. ................. | 455/415 |
| 5,748,896 | A | * | 5/1998 | Daly et al. ................. | 709/223 |
| 5,812,533 | A | * | 9/1998 | Cox et al. ................... | 370/259 |
| 5,838,970 | A | * | 11/1998 | Thomas ...................... | 709/316 |
| 5,898,839 | A | * | 4/1999 | Berteau ...................... | 709/227 |
| 5,907,607 | A | * | 5/1999 | Waters et al. .......... | 379/201.03 |
| 5,915,008 | A | * | 6/1999 | Dulman ...................... | 370/352 |
| 5,966,434 | A | * | 10/1999 | Schafer et al. ......... | 379/201.01 |
| 5,991,811 | A | * | 11/1999 | Ueno et al. ................. | 709/219 |
| 6,044,142 | A | * | 3/2000 | Hammarstrom et al. ..................... | 379/201.01 |
| 6,044,264 | A | * | 3/2000 | Huotari et al. ........... | 455/414.1 |
| 6,122,510 | A | * | 9/2000 | Granberg .................... | 455/432 |
| 6,208,856 | B1 | | 3/2001 | Jonsson ...................... | 455/424 |
| 6,209,018 | B1 | | 3/2001 | Ben-Shachar et al. | |
| 6,324,275 | B1 | * | 11/2001 | Yagel et al. ................ | 379/201 |
| 6,333,931 | B1 | | 12/2001 | LaPier et al. | |
| 6,360,266 | B1 | | 3/2002 | Pettus | |
| 6,366,657 | B1 | | 4/2002 | Yagel et al. | |
| 6,418,461 | B1 | * | 7/2002 | Barnhouse et al. ......... | 709/201 |
| 6,430,600 | B1 | | 8/2002 | Yokote | |
| 6,564,270 | B1 | | 5/2003 | Andert et al. | |
| 6,628,769 | B1 | | 9/2003 | Vleer et al. | |

FOREIGN PATENT DOCUMENTS

| WO | 95/23483 | 8/1995 |
|---|---|---|
| WO | 96/13949 | 5/1996 |
| WO | 98/09421 | 3/1998 |

* cited by examiner

*Primary Examiner*—Rupal Dharia
*Assistant Examiner*—April L Baugh

(57) ABSTRACT

A method and apparatus for deploying and activating services in a communications network. In the context of a communications network that deploys service functionality by distributing managed software objects to service processing nodes, the present invention relates to selectively dispensing managed objects from a central repository and coordinating the instantaneous activation or deactivation of services throughout the network. Furthermore, where a managed object service creation environment is coupled to such a network, the method and apparatus of the present invention provides security, back-up, and version control of managed objects and other network data stored in the repository.

4 Claims, 6 Drawing Sheets

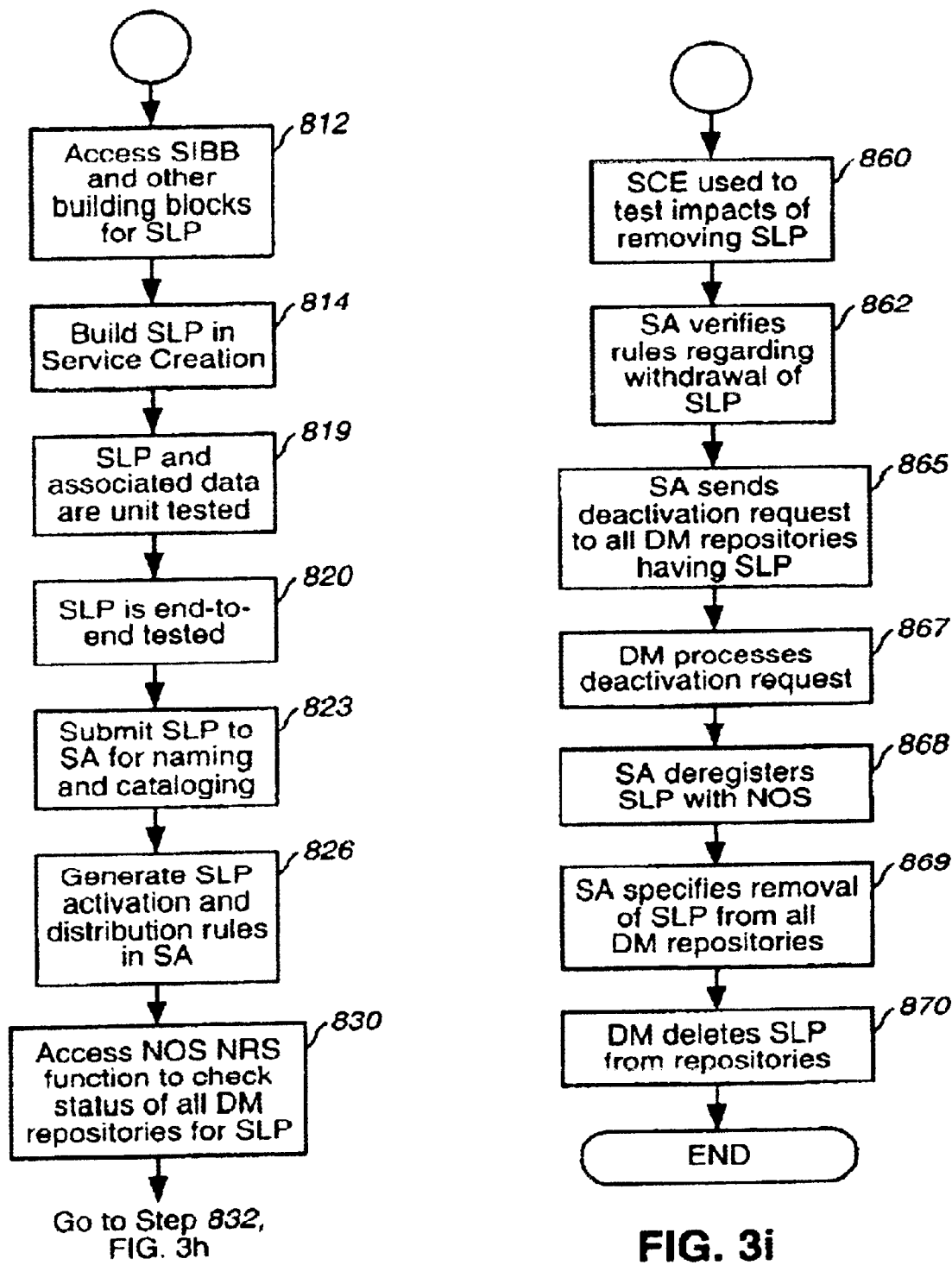

METHOD AND APPARATUS FOR DEPLOYING SERVICE MODULES AMONG SERVICE NODES DISTRIBUTED IN AN INTELLIGENT NETWORK

CROSS-REFERENCE TO RELATED APPLICATION

This Application is a Continuation-In-Part of commonly assigned, copending U.S. patent application Ser. No. 09/128,937, filed Aug. 5, 1998, now U.S. Pat. No. 6,418,461, entitled "Intelligent Call Platform for an Intelligent Network Distributed Architecture" which claims the benefit of U.S. Provisional Application Ser. No. 60/061,173, filed Oct. 6, 1997, both of which are incorporated herein in their entirety by reference thereto. This application additionally claims the benefit of U.S. Provisional Application Ser. No. 60/104,890, filed Oct. 20, 1998, the whole contents and disclosure of which is incorporated by reference as if fully set forth herein.

FIELD OF THE INVENTION

The present invention is related generally to Intelligent Networks, and, more particularly, to a novel administration system for deploying service packages and components including executable programs and data to service nodes capable of service processing in a distributed intelligent network.

BACKGROUND OF THE INVENTION

In general, a communications network serves to transport information among a number of locations. A commercial communications network, such as the public switched telephone network, is owned by, and provides revenue to, a service provider. Subscribers pay the service provider for access to the communications services provided by the network. There are a variety of transport technologies used in communications networks and a variety of information types and formats that are commonly transported.

In its simplest form, a communications service involves real-time transport of information, such as data or voice signals, among locations served by the network. In a commercial telephone network, this basic service typically amounts to establishing a two-way voice channel among a pair of telephone service subscribers.

Beyond basic communications, more advanced services may be offered by some networks. For example, a telephone network may provide enhanced features such as call forwarding or voice mail. To access or invoke these features, a subscriber usually interacts with the network in some fashion, such as pressing a sequence of keys on a telephone keypad. By this interaction, the network performs desired functions at the request of each user or subscriber.

User actions, such as lifting the handset of a telephone receiver or pressing keys on a telephone keypad, are events that are recognized by the communications network. Other events, such as equipment fault alarms, may be generated internally by the network during its operation. The intelligence that controls the network, in whatever form, must receive and process these events and direct the network's traffic-handling elements to take appropriate action in providing services and recovering from partial network failures.

While a telephone network serves as a well understood example in the present context, those of skill in the art will recognize that other types of networks may be designed and operated to provide services in an analogous fashion. For example, a data network may be used to transport information representing data files or video and audio data streams. Examples of enhanced services in a data network include data store-and-forward and multicast capabilities. Other types of network services may be directed at assisting a network owner with security, validation, and authentication of users and network administrators.

Typical telecommunication networks are composed of nodes interconnected by communications links. Each node is a site that typically comprises equipment, such as a space-domain or time-domain switch or a packet-switching router, that is used to direct the flow of information. Many nodes also provide equipment that interfaces users to the network. Nodes are connected by transmission links so that information can flow from node to node and thereby travel from an origin node to a destination node via the network. Switching equipment, routers, and other equipment at the nodes in a network must be properly coordinated to ensure that information flow and other services are provided to satisfy the needs of the network users.

The switches within the nodes of a typical telephone network are controlled by integrated or imbedded processors operated by proprietary software or firmware maintained by each switch manufacturer. Adding or modifying a service requires changes to be made in the software that controls a communications network. Traditionally, a switch manufacturer's software or firmware provides some or all of the function of service processing and other types of network-related processing. This means that when a network owner desires to implement a new service or modify an existing service, the software of every switch in the network must be revised by the various switch manufacturers.

The fact that a large network usually contains a variety of switches from different manufacturers necessitates careful development, testing and deployment of the new software before release into a live traffic-bearing network. The time required to develop, test and deploy the new software is prolonged because the code size at each switch grows larger and more complex with each new revision. For this reason, code changes can take many months to implement. In addition, this increased complexity further burdens the switch processors, increases the chances for switch malfunction, and may even require the modification or replacement of antiquated switch hardware.

Furthermore, a new feature or function sometimes requires a change in a basic operating model or interface that is standardized within the communications industry. Changes of this magnitude may require ratification by industry standards groups—a process which can delay the introduction of a new feature by several years.

There are further disadvantages to relying upon proprietary software components in the products of various switch vendors. The fact that multiple network owners depend upon a common set of switch manufacturers results in undesirable situations that limit competition. A manufacturer's software release may attempt to incorporate changes requested by several network owners, thus preventing the network owners from truly differentiating their services from the services provided by their competition. This also forces some network owners to wait on a desired new feature while the manufacturer incorporates requests from other network owners into the new release. Furthermore, a switch software release incorporating a function as requested by one network owner to implement a new service can unintentionally become accessible to other network owners.

These problems have become intolerable as the demand for new network services has increased exponentially over the last five to ten years due to increased subscriber mobility, increased variety and bandwidth of traffic, dissolution of traditional numbering plans, deployment of more sophisticated services and increased competition among service providers. Thus, it is widely recognized that new network control architectures need to incorporate a more flexible way of creating, deploying and executing service logic.

A new network control architecture referred to as "IDNA" is described in co-pending, commonly-assigned U.S. patent application Ser. No. 09/128,937, filed Aug. 5, 1998 and entitled "Intelligent Call Platform for an Intelligent Distributed Network Architecture." This novel network architecture differs from the prior art in at least three important aspects. First, service processing is entirely removed from individual traffic-bearing elements, such as switches and routers. This eliminates the dependency of service function upon proprietary switch-resident software. Secondly, service processing occurs in a "virtual machine" processing environment and processing functionality exists in the form of managed objects within this environment. Finally, a unified platform for service creation, service test, and service deployment, and service processing is introduced offering many significant advantages.

Additionally, the above cited U.S. patent application Ser. No. 09/128,937 introduces the terminology of a "resource complex" to describe the collection of network components which must be controlled by an intelligent network control system to implement services for users. The resource complex generally comprises switches, transmission equipment, and the like that directly handle and route information traffic through the network. The resource complex may also comprise so-called special resources such as automated voice response systems, voice mail systems, echo cancellors, data storage devices, and data conversion components, to name a few.

In the context of a network that implements services as managed objects within service processors, what is further desired is a means for coordinating the deployment of managed objects and other components to service processors so as to implement new services without impacting the reliability of the network. Such coordination may entail, for example, checking of interdependencies among software elements that must be present in each service processor.

Furthermore, as service function is deployed to various service processors, some means is required for synchronizing and otherwise coordinating the activation of new services such that, at the instant of activation, an adequate number of service processors are equipped to cooperatively supply the new service. Similarly, some means is desired for coordinating the deactivation of service processing components without impacting the operation of the network.

It may also be desirable to selectively deploy service functionality to certain service processors based upon, for example, hardware capabilities at certain sites or upon arbitrary rules or criteria established by network engineers. Such rules or criteria may achieve load balancing or preferred location processing ("homing") among service processors.

Where a service creation environment is coupled to a service deployment and service processing environment, some means is desired for ensuring the validity of the service components. For example, some means is desired for providing both access security and version control of managed objects to protect the integrity of the service components. Furthermore, during the deployment of service components as managed objects, some means is desired for ensuring that a correct version of each managed object is deployed even if several versions of a given component may exist in the system at a given time. This is especially important because older versions of managed objects are likely to be kept for back-up and regression purposes and because newer unreleased versions will also be stored in the creation and deployment environment while being developed and tested.

SUMMARY OF THE INVENTION

The present invention is directed to a communications system comprising a service administrator that controls the distribution of managed objects among service processing nodes. The service administrator maintains a repository known as a "global database of record" (DBOR) wherein service functions are stored as managed objects. The service administrator is responsible for naming, cataloging, distributing, activating, auditing, deactivating and removing of all managed objects and data used for service processing in a network.

In a preferred exemplary embodiment, the communications network according to the present invention further comprises a service creation environment where managed objects may be developed and tested. The service creation environment is coupled to the network through the service administrator. The service administrator provides both access security and version control for the managed objects that are stored in the database of record. Service creation is performed by retrieving managed objects from the DBOR via the service administrator. Managed objects that are newly created or modified in the service creation environment are also submitted to the service administrator for storage in the DBOR.

In a further preferred exemplary embodiment, the managed objects that are distributed to each service processing node are maintained in a local database of record at each node. The local database of record at each service processing node is an extract of the global DBOR maintained by the network service administrator component.

In still another preferred exemplary embodiment, the local database of record at each service processing node is maintained by at least one data management component. The data management component makes managed objects and other data available to service processors at the service processing node. In particular, the data management component serves as a persistent store for managed objects, operating data such as adjacent node connection information, and other data created during service processing. Data management component also controls the replication of managed objects within various service logic execution environments (SLEE's) at the service processing node. By virtue of maintaining a local storage, the data management component affords fast restoration of normal operations after, or in response to, a network equipment failure, maintenance switchover, or other similar circumstances. For example, if a service processing hardware element suddenly fails, the service processing context can be replicated in another processor and the service resumed without interruption. Having the data and managed objects stored locally at each service processing node provides for fast fail-over and recovery without the delays associated with retrieving managed objects from the network service administrator component.

Network engineers can implement rules within the data management component that determine how and when managed objects are replicated. The data management component checks for successful and accurate downloading of managed objects from the DBOR. The data management component likewise checks for accurate copying of managed objects among the service processors as needed.

The network-wide service administration function and the data management component at each service processing node cooperate to ensure that managed objects that embody service functionality are correctly distributed and activated. Furthermore, the service administration and data management components may coordinate the distribution of managed objects based upon network hardware attributes, such as the availability of specialized equipment at certain service processing nodes. For example, a given service processing node may include a voice response unit as a special resource in its resource complex domain. Accordingly, specialized managed objects related to control and handling of traffic for this specialized resource is selectively distributed, activated and instantiated at this given service processing node. Among other service processing nodes that do not have this resource, the local database of record for each node need not be burdened with maintaining the specialized managed objects in support of this special resource.

In a preferred exemplary embodiment of the present invention, the service administrator assumes the same control and monitoring functions of a traditional network management system (NMS). For example, the fault alarms that are normally reported by network equipment to a network management system are monitored and processed by the service administrator. Furthermore, as with a traditional NMS, the service administrator communicates directly with network equipment via control links and can exercise remote control of the operation of the equipment. From a practical standpoint, the service administrator shares much the same degree of connectivity with network service processing elements and traffic-handling equipment as the traditional NMS. Therefore, to avoid redundancy, it is advantageous to simply meld NMS functionality into the service administrator. The same DBOR that is used to store service function as managed objects can also store network data such as topology information and equipment identification indices. This integration is particularly advantageous in that current knowledge of network topology, equipment deployment and operating status can be used to responsively determine where and when to deploy the managed objects which implement service functions.

In yet another preferred exemplary embodiment of the present invention, the communications network further comprises a network operating system (NOS) that provides communications connectivity among functional elements of the communications network. The NOS provides platform-independent and location-independent connectivity among network control components. Furthermore, the NOS comprises some additional functional components which are generally available to all network control elements to manage, for example, the utilization of instantiated managed objects among all the service processing environments in a network.

BRIEF DESCRIPTION OF THE DRAWINGS

The above and further advantages of the present invention may be better understood by referring to the following description in conjunction with the accompanying drawings, in which:

FIGS. 3(g)–3(i) illustrate flow diagrams generally depicting the service creation and deployment phases of the IDNA/NGIN system.

DETAILED DESCRIPTION OF A PREFERRED EMBODIMENT

Figure 1:
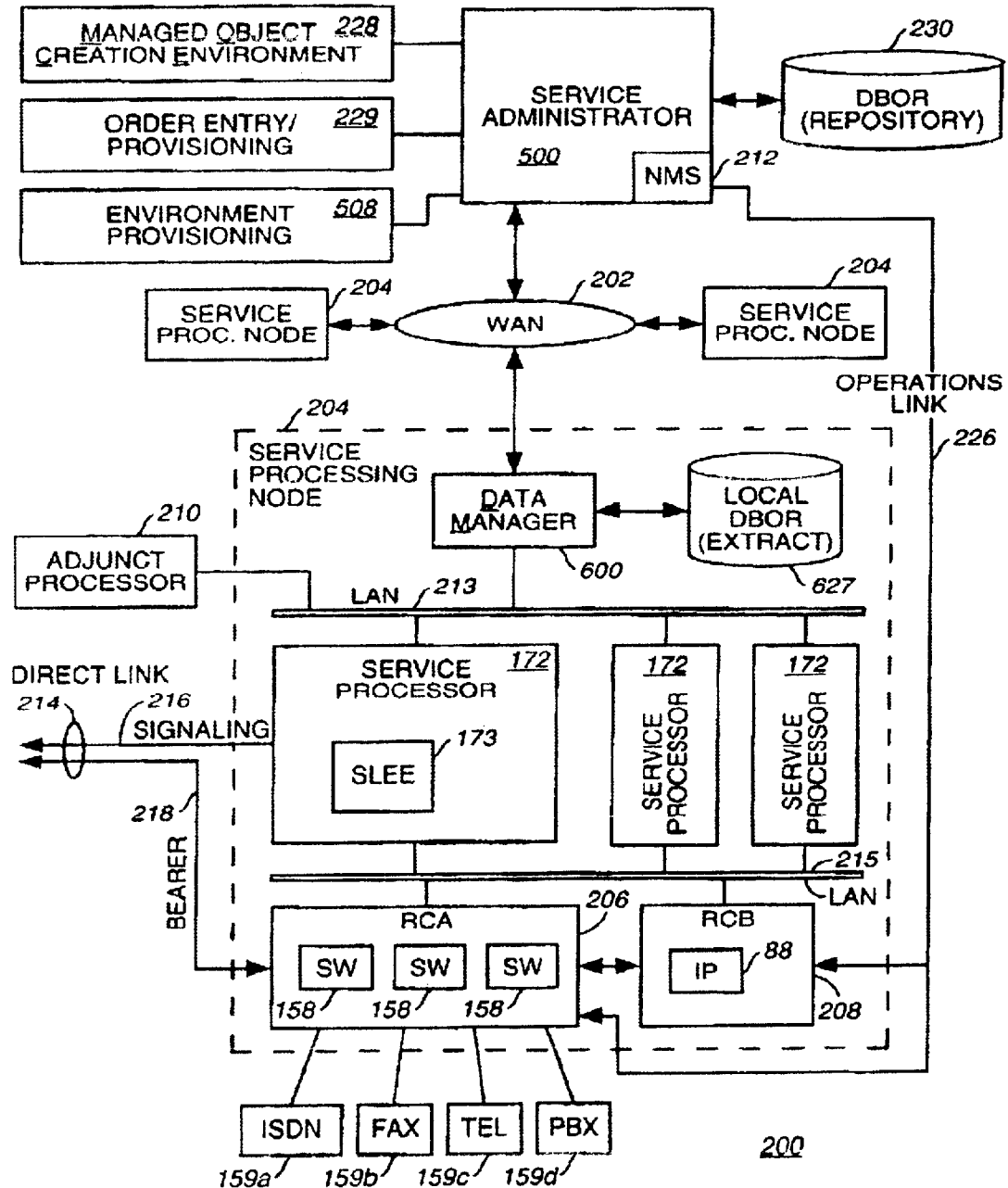
FIG. 1 is a logical and functional diagram of a telecommunications system employing an intelligent distributed network architecture in accordance with a preferred embodiment of the present invention.

The present invention is directed to a service administrator that manages the development and deployment of managed objects in the context of a network control architecture that uses such objects. In particular, the service administrator assures the integrity of managed objects and other data needed for network control and service processing. This, in turn, ensures reliable operation of the network even as new services are implemented.

In the present context, one network control architecture within which the present invention may be embodied is referred to as the Intelligent Distributed Network Architecture/Next-Generation Intelligent Network architecture, or simply designated as the IDNA/NGIN architecture or system. Accordingly, a service processing node may be referred to as an IDNA/NGIN node.

Now referring to FIG. 1, a telecommunications system employing an intelligent distributed network architecture (IDNA) in accordance with the present invention will be described and is denoted generally as 200. The Wide Area Network ("WAN") 202 is a data communications system that supports the distribution of applications and data across a wide geographic area. Preferably, the transport network used to implement WAN 202 is based upon Synchronous Optical NETwork ("SONET") and connects the service processing nodes 204, enabling the applications within those nodes to communicate with each other at high speeds.

Each service processing node 204 includes at least one service processor 172 and a resource complex. FIG. 1 illustrates a service processing node 204 having a Resource Complex A ("RCA") 206 and a Resource Complex B ("RCB") 208. Several example user terminals 159 are shown in FIG. 1 connected to RCA 206. ISDN terminal 159a, facsimile machine 159b, telephone 159c, and private branch exchange (PBX) 159d are all examples of equipment by which users access the services of network 200.

A resource complex, such as RCA 206, comprises equipment that directly handles the user's information traffic transported by the network. The equipment and other resources within the resource complex are controlled by service processors to provide information transport and other services needed by the network users.

Service processor 172 may be connected to one or more Adjunct Processors 210, which traditionally provide support functions, such as provisioning, billing and restoration. These functions may be absorbed by functionality provided by a Network Management System ("NMS") 212. In the preferred embodiment, however, these support functions may be further subsumed in a centralized Service Administration ("SA") system 500, as described later.

As further shown in FIG. 1, service processor 172 may be also linked to other service processors 172 via LAN 213, to other networks (not shown), or to other devices (not shown) through a direct link 214 having signaling link 216 and bearer link 218. A direct link allows devices to send signaling directly to the service processor and avoid the latency and other constraints (such as data format) associated with submitting signaling through the resource complex. The service processor 172 is the "brain" of the service processing node 204 and is preferably a general purpose computer, which may range from a simple single processor computing system to a large scale computer network, depending on the processing requirements of the service processing node 204. Preferably, the general purpose computer will have redundant processing, memory storage and connections.

Each service processor 172 operates at least one service logic execution environment (SLEE) 173 wherein managed objects are instantiated and interact to accomplish service processing function.

An Intelligent Peripheral ("IP") 88 provides the ability to process and act on information contained within the actual call transmission path. IP's 88 are generally in a separate Resource Complex, such as RCB 208, and are controlled by the service processors 172 in a similar manner as RCA 206. For example, some varieties of IP's can provide real-time processing upon voice signals in a call transmission path using Digital Signal Processing ("DSP") technology.

The Network Management System ("NMS") 212 is traditionally used to monitor and control hardware and services in the service processing 200. The NMS 212 implementation might be a Telecommunications Management Network ("TMN")-compliant framework which provides management of the components within the network 200. In a preferred embodiment, for practical reasons, NMS 212 is included within service administrator 500. The NMS 212 can directly monitor and control the operational status of RCA 206 and RCB 208 through a standard operations link 226, as is well known in the art.

As further shown in FIG. 1, a Managed Object Creation Environment ("MOCE") 228 includes sub-components to create services that run in the communications network 200. The Service Independent Building Block (SIBB) and API representations that a service designer uses to create new services are imbedded within the MOCE'S primary sub-component, a Graphical User Interface ("GUI"). The MOCE 228 is a unified collection of tools hosted on a single user environment or platform, alternately referred to as a Service Creation Environment (SCE). It represents the collection of operations that are required throughout the process of service creation, such as service documentation, managed object definition, interface definition, protocol definition and data input definition, which are encapsulated in managed objects, and service testing. The network owner only has to develop a service once using the MOCE 228, because managed objects can be applied to all the nodes on his network. This is in contrast to the network owner having each of the various switch manufacturers develop their version of the service, in which case the service would have to be developed multiple times.

Figure 2:
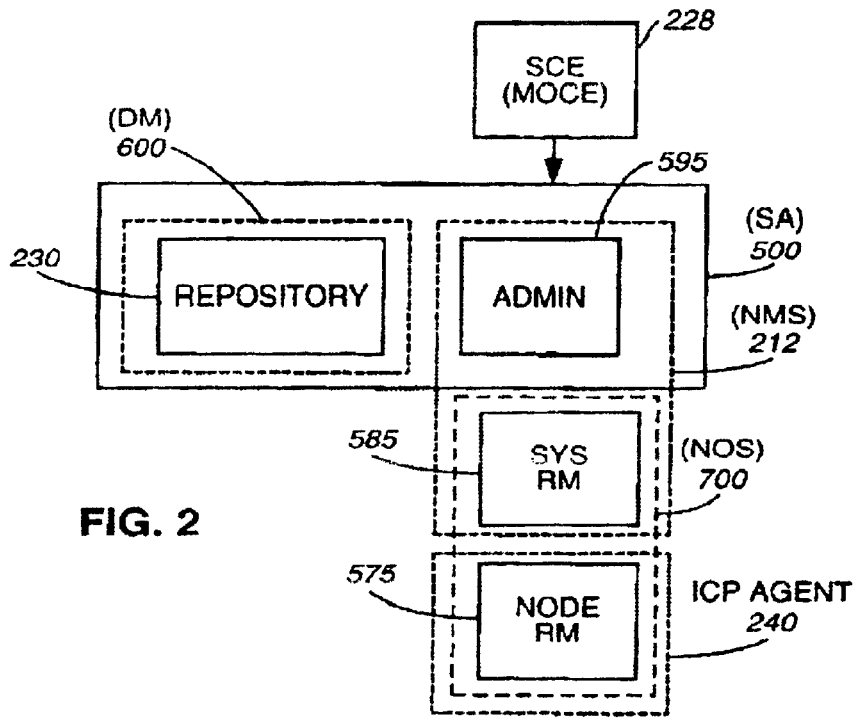
FIG. 2 is a diagram depicting how required network control functions are mapped into functional components in accordance with a preferred embodiment of the present invention.

FIG. 2 is a Venn diagram useful for describing how functional elements of the present invention relate to functional elements needed for managing network data and computing resources, especially those described in the co-pending U.S. patent application Ser. No. 09/128,937 cited earlier.

FIG. 2 contains several functional elements that are described in detail elsewhere. Briefly, repository 230 serves as a central point of storage for all data, such as managed objects, routing tables or translation tables, needed by a communications network.

Administrative function 595 in FIG. 2 represents central control of deployment of data and managed objects to network service processors, as well as provisioning and activation of services.

Node resource management (NODE RM) 575 refers to the real-time coordination of instantiated objects and data resources within the realm of a single service processing node. This allows for location-independent sharing and invocation of service-related objects. For example, several processors may be present at a service processing node and be connected by a local data network, such as a Local Area Network (LAN).

When a first service object being processed in a first computer needs a second service object that is available in another computer in the node, NODE RM 575 is the function by which the first service object may readily find and employ the second object despite the fact that the second object is running on a different computer.

Similarly, system resource management (SYS RM) 585 in FIG. 2 refers to real-time coordination of instantiated objects and computing resources on a network-wide scale, i.e. among service processing nodes.

Finally, a service creation environment, especially a managed object creation environment (MOCE) 228, is included in FIG. 2 to represent the point where managed objects are originally created and tested.

In accordance with the IDNA architecture described earlier, an administrative function 595 and SYS RM 585 roughly corresponded to a single entity, namely NMS 212. NODE RM 575 roughly corresponds to a so-called ICP-NMS agent function 240 described in the IDNA architecture.

Repository 230 and MOCE 228 are essentially equivalent to similarly named elements described in the IDNA architecture.

In a preferred embodiment of the present invention, the functions in FIG. 2 are grouped differently, as follows:

The real-time resource coordination functions of SYS RM 585 and NODE RM 575 are encompassed by network operating system (NOS) 700.

While repository 230 represents persistent storage of network data objects, the outline of data manager (DM) 600 represents that persistent storage is also distributed among service processing nodes.

Furthermore, in accordance with a preferred embodiment of the present invention, administrative function 595 is integrated with repository 230 to form service administrator (SA) 500. By this grouping, SA 500 becomes a gatekeeper or librarian that protects the integrity of data objects stored in repository 230. Even MOCE 228 must go through SA 500 to store and retrieve data objects.

Figure 3A:
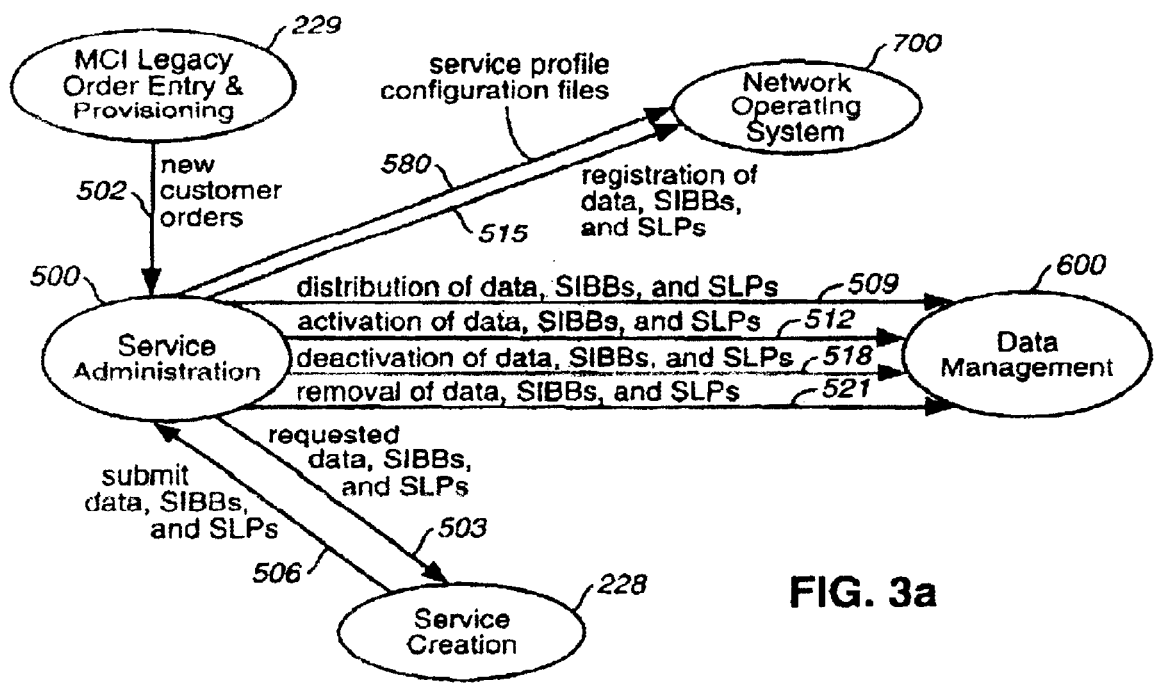
FIG. 3(a) illustrates conceptually the functionality of the service administration component 500.

As shown conceptually in FIG. 3(a), the Service Administration component 500 is a component that performs all of the functions needed to manage, store, and distribute all services and service data used by service processing nodes and to configure both the hardware and software components throughout the network control system depicted in FIG. 1. Generally, as show in FIG. 3(a), the SA component 500 is responsible for: cataloguing and storing the created objects and data from MOCE (Service Creation) 228; returning official copies of managed objects and data to MOCE 228 for service development purposes; requesting service packages, SIBBs, SLPs or other service or data components 503 from MOCE 228; receiving completed and tested service packages, SIBBs, SLPs or other service or data components 506 from MOCE 228; receiving customer order data 502 from order entry and other legacy systems 229 to provision the IDNA/NGIN system for use by customer; providing unique names to each service component; and, deploying managed objects and data to network service processors via Data Management functions 600, as will be described in greater detail herein.

In addition, as shown in FIG. 2, Service Administration component 500 maintains the repository 230. Repository 230 mainly includes a global Database of Record ("DBOR") comprising all IDNA services and data from which each Data Management component 600 ultimately receives all of its data.

Other responsibilities of Service Administration include: activating data and service components 512 to ensure that all data, SIBBS and managed objects or service logic programs SLPs are available for nodes via the Data Management component 600; registering the names of the data, SLPs and SIBBs 515 by feeding their logical names to a Network Operating System ("NOS") component 700, to be described in detail below, for registration therewith; distributing data and service components 509; deactivating data and service components 518; and, removing data and services 521 from the IDNA/NGIN system via the Data Management component 600. Service Administration additionally performs a configuration management function by maintaining the state of each SIBB and service (pre-tested, post-tested, deployed, etc.), in addition to versioning through its naming process. This ensures a service is not deployed until all components of that service have been successfully tested and configured.

The Service Administration component 500 further performs the function of configuring and provisioning the IDNA/NGIN service nodes 204 in accordance with configuration information that SA receives. Particularly, based on the received configuration information, the SA component 500 determines the capabilities of each component at each service node 204, which services and data to distribute to which nodes, which services will run on which server(s) resident at the service node, and which data will be cached to local memory resident associated with IDNA/NGIN node server(s). Particularly, SA deploys configuration rules contained in service profile (configuration) files 580 to a Local (node) Resource Manager ("LRM") component 575 of the NOS system 700 for storage in the local LRM cache located at each service node. As will be described in greater detail herein, these configuration files 580 determine which services to execute at an IDNA node. The LRM first reads this service profile file 580 stored in the local cache at that node, and determines a specific Service Layer Execution Environment ("SLEE"), e.g., a virtual machine, to run a service on in accordance with the rules in the service profile file and, which services are to run actively (as persistent objects) in the SLEE, or are to be instantiated only on-demand.

Figure 3B:
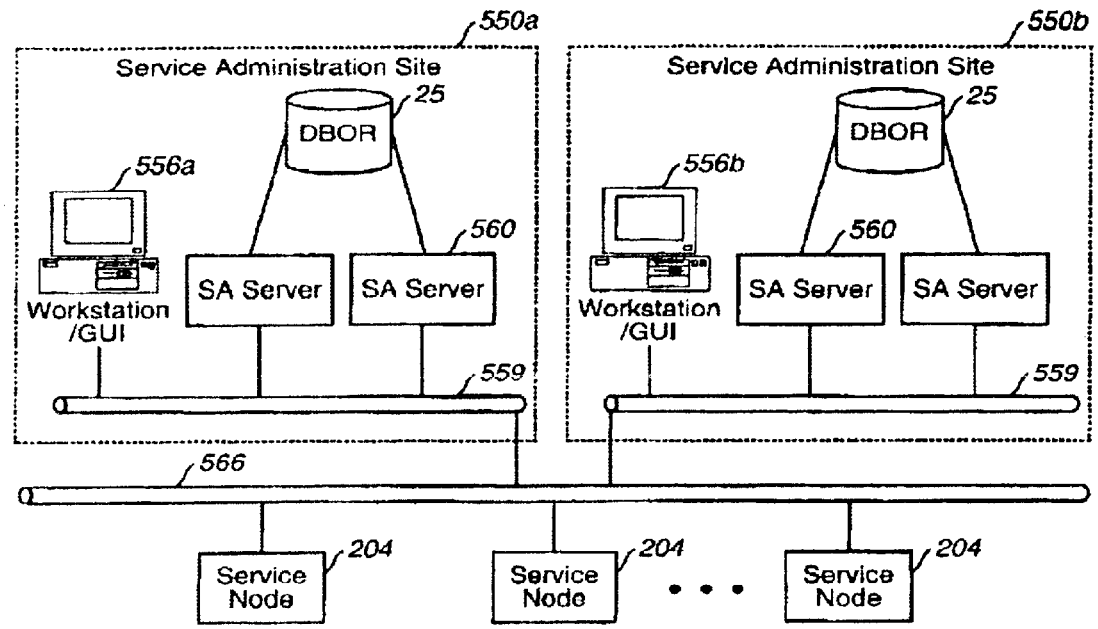
FIG. 3(b) illustrates the physical architecture of the service administration component 500.

FIG. 3(b) illustrates a preferred physical architecture for Service Administration component 500. While Service Administration is a centralized function, it may be embodied as two or more redundant Service Administration sites, e.g., sites 550a, 550b, for reliability with each SA site comprising: SA Servers 560, which may comprise dual redundant processors with a shared disk array 25 comprising the global DBOR 230; and, a personal computer (PC) or workstation 556a,b resident at each respective site 550a, 550b having an interface to enable user access to all Service Administration functions and particularly initiate data and service distribution to specified IDNA/NGIN service nodes, depicted in FIG. 3(b) as services nodes 204. The aforementioned data and service distribution activation functions all execute on one or more SA Servers 560 found at each site. The components at each respect SA site 550a,b are connected by an Ethernet LAN 559, which, in turn, is linked to a WAN 566 for communication with the service nodes.

Figure 3C:
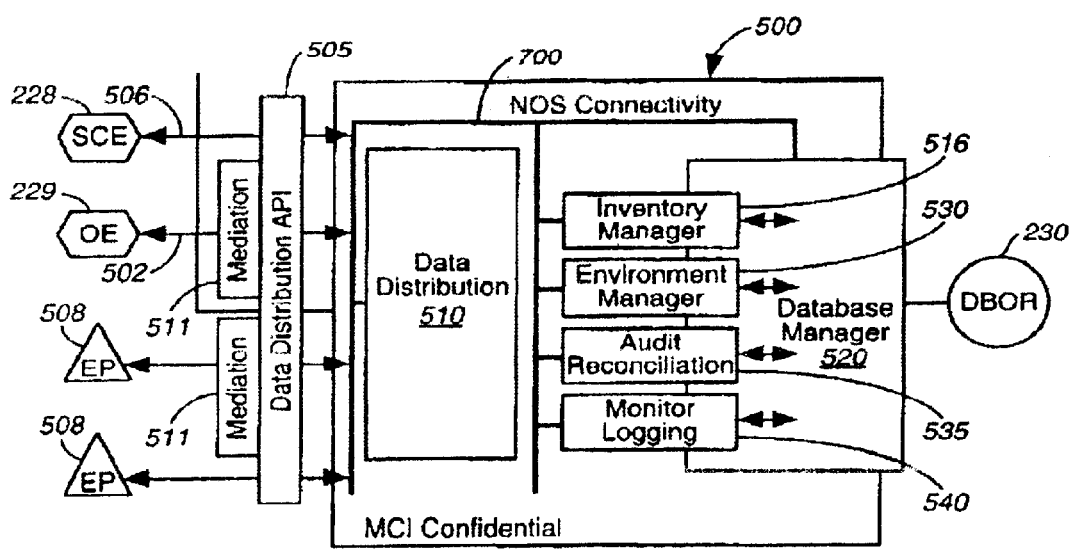
FIG. 3(c) illustrates the general functional architecture of the Service Administration component 500 of the IDNA/NGIN system 100.

Referring back to FIG. 2, the NGIN Data Management component 600 functions in both a service life-cycle and service utilization capacity. Whereas Service Administration component 500 maintains global database of record (repository) 230, Data Management component 600 provides the local data store and data management functions for each IDNA/NGIN service processing node 204. This includes all types of data needed for service processing, such as: service programs and SIBBs, data for services (customer profiles, telephone numbers, etc.), multi-media files (such as audio files for Interactive Voice Response ("IVR") services), etc. Specifically, the Data Management component 600 of a service node receives an extract of the SA global DBOR comprising all data needed for the services performed by the local NGIN service node as specified by Service Administration FIG. 3(c) illustrates a preferred physical embodiment highlighting the main functional components of and external interfaces to the Service Administration component 500 of the invention. As shown in FIG. 3(c), the Service Administration component 500 comprises a Data Distribution sub-component 510 that: 1) provides for the reliable communications with external systems; 2) performs any data translation and formatting functions for receiving data from external systems and distributing data from SA to external systems, typically through the intermediary of a common Data Distribution Application Program Interface (DDAPI) 505; 3) extracts data from communications messages received from external systems for input to an Inventory Manager sub-component 516; 4) provides a multipoint distribution function for service/data packages with a store and forward feature and guaranteed delivery and recovery services; and 5) provides for the delivery of data sets in sequence, in addition to gap checking, duplicate checking, receipt acknowledgments, and ensures security of data transmissions.

As shown in FIG. 3(c), the input feeds to SA component 500 include: a feed 506 from MOCE/SCE 228 from which service components, packages and SIBB modules used to build services are fed; an Order Entry ("OE") feed 502 from which customer data is input to perform service provisioning functions; and, one or more Environment Provisioning ("EP") system feeds 506 from which user specifications are input to direct SA 500 on how and where to distribute the services created by the MOCE component 228. More particularly, with regard to the Environment provisioning system feed 508, each service node component that is considered part of the NGIN service processing environment (computer hardware, operating system, SLEE, local caches of Data Management) is specified with a service node profile, comprising that node's physical capabilities (e.g., storage capacity, memory capacity, computer processing capacity, etc.). Via a GUI version of the EP system 508 GUI (not shown), a user specifies, based on the service node profile (capabilities) of each service node, a service profile comprising which service objects (e.g., SLPs, SIBBs, data, etc.) are to be deployed to which SLEEs at which nodes, which data are to be deployed to which nodes, and, the local caching strategy of each SLEE and computer. These specifications are input to SA and are used by an Environment Manager sub-component 530 to specify the correct distribution of services and data.

More specifically, the Environment Provisioning system interface is used to enter the service node profiles as well as direct the distribution of service profiles to the appropriate service nodes. Service nodes may be matched with service profiles automatically, based on the capabilities of the service node and the requirements of the service profile, however, a service profile may specify that a service node be selected manually. If a service profile requests that it be matched against service nodes manually, the service will not be distributed until the match is made using EP System 508. If the service profile requests that the service be distributed automatically, the service may be matched and distributed automatically, however, the Environment Provisioning interface may override this and change the distribution at a later time.

The Data Distribution API 505 provides the standard interface for utilizing all of the SA functions and further interacts with the Data Distribution sub-component to provide guaranteed delivery/recovery services. Particularly, the DDAPI 505 provides a standard message set for utilization by service administration clients, which are the local Data Management components of each service node. The SCE and EP system are also designed to interface with Service Administration via the DDAPI. Other external systems, however, such as OE systems 229, may not designed to utilize DDAPI, and, consequently, a mediation process 511 may be used to adapt communications protocol and messaging formats of such external systems to the DDAPI 505.

As shown in FIG. 3(c), only a single DDAPI 505 and Data Distribution process 510 is required for all external interfaces. All external systems that interface with Service Administration have access to all of its functions, depending on the privileges allowed to each. This ensures that functions such as DBOR updates, for example, are all handled in the same manner, regardless of who initiates them, and, further, eliminates special case processing. This also ensures that the same data integrity checks that are provided to some systems (e.g., OE) are provided to other systems (e.g., Network Elements), and further, encourages development of external systems to interface with Service Administration.

As further shown in FIG. 3(c), the SA component 500 comprises the following sub-components: an Inventory Manager 516; a DBOR Manager 520; an Environment Manager 530; an Audit and Reconciliation Manger 535, and, a Monitoring and Logging Manager 540. The functions of each of these will now be explained in greater detail.

The Inventory Manager sub-component 516 receives all data entities from external sources, via the Data Distribution process 510. These data entities include services and SIBBs from Service Creation, service data and customer data from order entry system feeds 502, and environment configuration and provisioning specifications from Environment Provisioning feeds 508. The Inventory Manager 516 provides a unique name to each data entity received according to a pre-determined naming convention. This includes multiple versions of the same data entity. Inventory Manager also ensures data integrity among the data received from multiple sources, and resolves any conflicts. For example, if Inventory Manager receives, from two different OE sources, two different network terminations (resolved from having applied any intelligent routing features) for the same customer toll-free telephone number, Inventory Manager will detect this by performing an audit on each received data entity. Upon detection, it may either perform a resolution algorithm (e.g., keep the network termination with the most recent date/time stamp), or, notify the user of the conflict. Inventory Manager then stores the named data entity in the DBOR 230. It uses a DBOR Manager 520 to actually store the data in the DBOR. The Inventory Manager also notifies the Environment Manager of any updates to the DBOR.

The DBOR Manager 520 provides a single interface to the DBOR 230 for the multiple functional components of Service Administration and performs all database management functions (add, delete, retrieve, modify, etc.). This is a significant function, in that the DBOR may actually comprise multiple databases for the purpose of storing multiple types of data: SLPs for services, SIBBs, datasets for customer and service data, multi-media data for IVR services, etc. Preferably, the DBOR comprises both object databases and relational databases. These databases may be provided by different vendors, and, therefore, require different command sets for performing database management functions. The DEOR Manager 520 encapsulates these variations from the other Service Administration components, so that any component that needs a DBOR function performed simply implements a common command set provided by the DBOR Manager, and a data entity name. The DBOR Manager 520 uses the data entity name provided, and adapts the requested command to a format used by the specific database type, to perform the requested function. There are three Service Administration sub-components that interface with the DBOR Manager: Inventory Manager 516, Environment Manager 530, and an Audit and Reconciliation Manager 535.

The Environment Manager sub-component 530 is responsible for deploying services and data from the DBOR to the local Data Management components at the NGIN service nodes. It does this by first determining which service/data entities needs to be distributed to which nodes; then issuing the appropriate distribution commands, along with the data entities extracted from the DBOR, to Data Distribution. Environment provisioning specifications that are input by a user via the EP system feeds 508, are stored in the DBOR and are used by the Environment Manager to determine distribution. In this way, Service Administration distributes to each NGIN service node only those data entities that will be needed by that service node. This feature reduces the storage requirements at each service node and network bandwidth and processing/transmission time needed for data distribution. It additionally enables the network-wide distribution of NGIN functions by simplifying data integrity, since the number of copies of a data entity is minimized. It should be understood that Environment Manager functions may require complex processing by Service Administration, but this complexity is easily encapsulated in distribution rules, which are applied by the Environment Manager. Additionally, Environment Manager 530 presents a valuable level of configuration provided to the NGIN system architecture. That is, while all data may be deployed to all service nodes to enable all services at each node, this is not necessary. A user may decide which services to render at which nodes to optimize network design, then deploy data necessary for those services to those nodes.

The Environment Manager 530 may be additionally notified by either the Inventory Manager or the DBOR Manager, whenever the DBOR is modified, for example, when a service has been replaced with a new version. The Environment Manager 530 ensures that each service node that is impacted gets updated (i.e., receives the new service version). When it receives notification of a DBOR update, it identifies each service node that uses the updated data or that provides the updated service and then distributes the updates to the local Data Management components at each impacted service node as described herein.

The Audit and Reconciliation (A/R) Manager 535 ensures data synchronization among the DBOR and its multiple extracts by running auditing routines to compare the data in the DBOR 230 with data in any of various DBOR extracts. It then determines corrective actions to re-sync the multiple databases. To implement these actions, the A/R Manager generates a data package containing data and commands to process this data. This data package is then provided to whichever databases are needed to implement the corrective action to re-sync the multiple databases. Preferably, this may be accomplished as follows: 1) during system idle time, it may run an auditing routine to look for and resolve any discrepancies between the data in the DBOR and the data in a DBOR extract, which may reside in a local Data Management database at a service node; and, 2) during real-time call processing, if a service application finds a discrepancy, e.g., a service application is given a key for a data lookup in Data Management, queries a database with this key, but finds no record, the application generates an alarm. This alarm is sent to the A/R Manager 535, which resolves the discrepancy.

The Monitoring and Logging sub-component 540 is a process which monitors the performance and stability of Service Administration processes, and logs certain or all events performed so that a user can later see what data was deployed to which nodes and when, for example.

As described, the global DBOR 230 may be one or more physical databases, partitioned to store and manage the many different types of data and services including: SLPs, SIBBs, service data and customer data, e.g., customer profiles including call record information, faxes and routing plans, and, multi-media files including voice mail messages and other audio and video files or objects for interactive services. While a plurality of DBORs may exist for redundancy and survivability, the DBOR 230 is a single logical storage of all NGIN services and data, for distribution to any and all other NGIN functional components and processes.

As further shown in FIG. 3(c), the SA component 500 implements the NOS component 700 to provide communications among the different Service Administration processes. For instance, the DDAPI 505 uses NOS services to provide a message set that uses the communications mechanisms of NOS to enable interfaces between external systems and Data Distribution 510, and between Data Distribution 510 and the other SA sub-components. The NOS 700, however, is not required for communications among the Inventory Manager, Environment Manager, A/R Manager, and DBOR Manager components as these processes, in a preferred physical embodiment, are designed to run on the same computing system. It should be understood that even in a distributed computing environment in which these processes run on different computing systems, these processes may communicate with each other using other internal APIs and communications protocols, e.g., TCP/IP sockets. It would be apparent to skilled artisans how to provide all Service Administration internal processes with the capability for using NOS for inter-process communications.

Figure 3D:
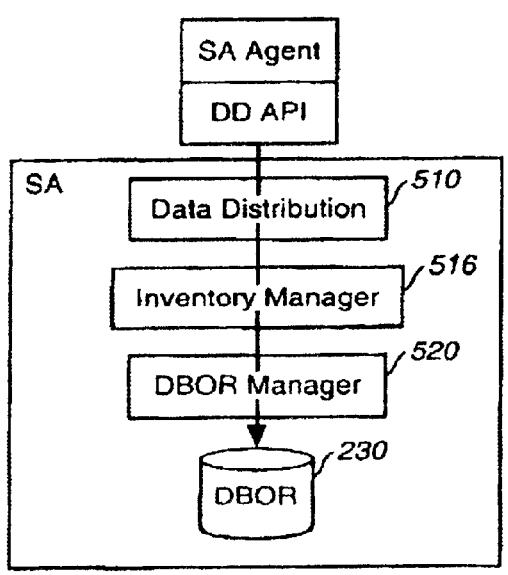
FIG. 3(d) illustrates the scheme employed by SA for updating the DBOR.
Figure 3E:
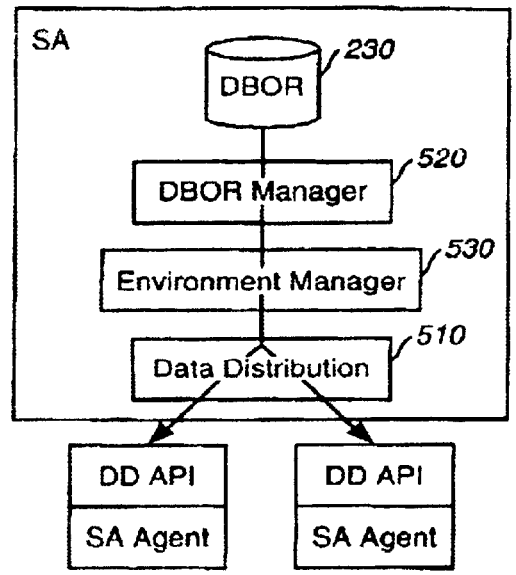
FIG. 3(e) illustrates the scheme employed by SA for distributing data from the DBOR to the data management components.

Having described the preferred embodiment of the SA component 500, a more detailed description of the major services performed by Service Administration 500, is now provided with reference to FIGS. 3(c)–3(e).

As a first major service, as mentioned, SA 500 is responsible for naming and performing versioning of services and data. That is, SA provides a unique name to every version of every service/data entity prior to storing the service/data entity in the DBOR 230, so that multiple versions of the same service/data entity may be maintained. When SA distributes the data/services to Data Management, a single logical name is provided with each entity, along with a unique version name, so that processes such as SLPs may call on a service/data entity with a common logical name without having to know which version is needed. It should be understood that the name registration requirements provide a detailed understanding of the need for data, SIBB, and SLP names to be unique, and for SA component 500 of NGIN to maintain the master copy of these various components. As data, SIBBs and SLPs are provided to SA, the creator of those components has identified them using a user name. This user name provides a way for MOCE/SCE to identify the component, in their terms; this user name is then uniquely identified with the single logical name, (i.e., a common reference). Preferably, SA implements a naming structure convention when naming new or modified components and, preferably maintains a mapping among the user name and the logical system unique names. In the performance of a request for data, SLPs and SIBBS, SA may provide the user name, in addition to the logical system unique name.

As a second major service, service administration component 500 is responsible for service provisioning, i.e., provisioning services with data needed to provide those services. This type of data is input to SA from the Order entry feed 502 and is stored in the global DBOR 230 prior to distribution to Data Management 600. This type of data may include, but is not limited to, customer profile data, such as customer service options, customer name and account data, terminating telephone numbers, call routing data, and any data potentially needed to process and complete a call for a service. As an example, when a 1-800 service is built in Service Creation for a corporate customer, that customer's name, account/billing information, 800 telephone number(s), terminating network addresses, service options (routing features, multi-media file identifiers) received from the OE system are need to provision the particular service(s). In this function, Service Administration 500 parses appropriate order entry feeds to create a consolidated and consistent order entry record to the NGIN and ensures that each feed received from an order entry system or from a provisioning system is acknowledged.

As a third major service, the SA component 500 is responsible for service support provisioning, i.e., configuring of the NGIN processing environments (hardware, operating systems, SLEE(s), sites, site LANs and inter-site WANs) and the provisioning of data that specifies these configurations. Specifically, each IDNA/NGIN service node has an associated service node profile that is input to SA via the Environment Provisioning sub-component 508 (FIG. 3(c)) and specifies the capabilities of the computing system, the functions the computing system is allocated, and the types of services that may be supported at that service node. An example service node profile, which may be embodied as a formatted data file in SA, is depicted in Table 1 as follows:

TABLE 1

| | |
|---|---|
| Computer Name: | Hayward #1 |
| Operating System: | SUN Unix |
| Processing Units: | 5,000 Units |
| Memory Units: | 3,000,000,000 Units |
| Disk Units: | 30,000,000,000 Units |
| 30,000,000,000 Units | 10,000,000 Units |
| Voice Playback Capability | |
| | |
| Data Management Access: | Full |
| Service Node Selection: | Manual |

Thus, in the example profile of Table 1, there is specified: a node name, an operating system for the computer executing service logic programs, the amount of memory, disk and data communication units, an indication that the node is capable of receiving customer specific data from SA (data management access) and, that the node can support special service features, for example, voice playback capability. It should be understood that the example Table 1 may include other types of information associated with the amount of resources and capabilities associated with a particular service node.

Additionally generated in the SA for each service is a service profile, which may be embodied as a formatted data file in SA, that specifies the service's requirements and to which SLEE(s) and/or computers within the network it should be deployed. An example service profile for a particular service to be deployed in the network is depicted in Table 2 as follows:

TABLE 2

| | |
|---|---|
| Profile Name: | Service 1001 for Customer X Announcements |
| Operating System: | All Unix |
| Processing Units: | 200 Units |
| Memory Units: | 30,000 Units |
| Disk Units: | 2,000 Units |
| Instantiate (Time Range, Min, Max): | 00:00–23:59, 1, 5 |
| Data Communication Unit (Average): | 10,000 Units |
| Data Communication Units (Burst): | 30,000 Units |
| Voice Playback Required | |
| Data Management Required: | Data Set 1001 |
| Service Start Date: | Jan. 1, 1998 10:00 |
| Service End Date: | None |

In Table 2, there is specified: a service profile name, e.g., service #1001 for a customer X; amount of processing units, memory, and disk space required to execute the service when instantiated; a node instantiate field(s) specifying a time range when a particular service (embodied as a service logic program, for example) is to be instantiated according to a predetermined business rule(s) specified in Service Administration, and a corresponding min/max field(s) indicating the minimum and maximum number of those service objects (SLPs) that may be instantiated by NOS during the specified time range; a special requirements field(s) indicating for example, that the service requires a particular service node capability, e.g., voice playback; and, service start data and service end data. It is readily apparent that SA may distribute the service (and service profile) of the example service 1001 of Table 2 to the service node having the service node profile depicted in Table 1, as the node clearly has the memory requirements and the voice playback support. It is additionally apparent that the example service #1001 depicted in the service profile in Table 2, requires a data set from customer X that would comprise, inter alia, a voice playback service announcement specific to that service #1001 provided by customer X. The SA component 500 will receive data via order entry feed 502 that includes the customer X voice playback announcement, and SA's inventory manager will assign it as a data set #1001, for example, for storage in the DBOR 230. In this manner, SA may automatically distribute the dataset #1001 to the service node(s) providing the service #1001 for customer X.

These service node profiles (e.g., Table 1) and service profiles (e.g., Table 2) are input to SA and stored therein to enable automatic tracking of: 1) the capabilities of each service node, i.e., how many computers and SLEE(s), and the resource capacity of each; 2) which services and data are to be deployed to which service nodes and when; and, 3) the configuration of service execution, i.e., at which times an SLP should run persistently versus on-demand, for example. The capabilities of each node and computer in the network is maintained, so that simple and complex business rules governing data/service distribution, data/service activation and data/service removal may be applied to optimize the execution of services on IDNA/NGIN service nodes. Thus, a part of the service support provisioning function is to determine which service to instantiate as a persistent object (to run actively) on which SLEE, with rules based on one or more criteria including, for example, load balancing among service nodes, network call routing efficiencies, and service demand. An example of this service support provisioning function now follows. As some services are more time-sensitive than others, the degree of tolerance callers may have for delays in a certain type of service may be used to determine whether that service runs actively in the SLEE as a persistent object, for example, and whether data for that service is to be cached to local memory to reduce latency. When considering service demand, a certain service may see peak demands, for instance, at night. The SA 500 thus allows a user to specify an SLP for this service to run actively (be instantiated as a persistent object in the SLEE) from 5:00 pm to 12:00 midnight, local time per each site, for example, and be instantiated only on-demand at other times. A rule in the service profile file (Table 2) generated by SA will reflect this.

As a fourth major service, the SA component 500 is responsible for distributing services and data to the local Data Management functional component at the selected IDNA/NGIN system nodes, in accordance with the strategies specified by the user. These strategies are embodied as specifications in the service package created in the Service Creation Environment 228, and also as specifications input by the user via the SA 500 as part of its service support provisioning function. Included in this function is the ability of SA to track the current state (e.g., tested, deployed) of data, SIBBs, and SLPs. Not only does it track the state, but additionally tracks the current versions of data, SIBBs, and SLPs and the various components (i.e., data, SIBBs, and SLPs) needed to create a specific version (including the various dependencies) of a service. In the global DBOR, SA stores each version of a service (i.e., including all SLPS encapsulated in a service SLP) and, moreover, tracks the configuration (e.g., physical address) of the various Data Management repositories, e.g., DBOR extracts, across the IDNA/NGIN network.

Moreover, the SA component 500 tracks services and data that have been distributed, in order to ensure integrity. For example, if a service is successfully deployed to a node, but distribution of the data needed for that service fails, SA detects this and either retries the data distribution or notifies the user. If after a predefined, configurable number of retries, the designated repository is unable to receive the distribution, SA generates an alarm and stores the pending distribution.

Further to the SA distribution function for distributing data, SIBBs and SLPs to Data Management, SA is also responsible for: 1) distributing SLPs, SIBBs and data to a network integration test environment for end-to-end testing; 2) enabling an authorized user to configure a preset time for a distribution; e.g., now (on-demand), noon today, 3 p.m. tomorrow; 3) initiating distributions based on a preset time; e.g., deploying a voice file at 1:15 a.m. tomorrow; 4) defining distribution rules that designate to which NGIN data management repositories are to receive SLPs, SIBBs and data; 5) determining the locations to distribute the data based on predefined distribution rules; 6) checking the status of a designated repository (by querying the NGIN NOS component) prior to a distribution; 7) attempting the distribution to all designated repositories reporting an on-line indication, and, if a designated repository is reporting an off-line indication, storing the distribution for that repository for future forwarding; 8) forwarding all pending distributions to a repository once an on-line indication is received from a designated repository that was previously off-line; 9) monitoring the distributions to Data Management. For example, if a distribution is for a new version of an existing SLP, SIBB or data entity, SA ensures that when the distribution is received, the existing data is not overwritten in Data Management; 10) receiving status indications of successful or unsuccessful distributions from Data Management and, updating the status of all data based on the successful/unsuccessful distribution status indications received from Data Management; and 11) logging all distributions to Data Management.

At this point, it is necessary to distinguish between the internal processes required to update the DBOR 230, as depicted in FIG. 3(*d*), and, the internal processes required to distribute service packages and data extracts from the DBOR, as depicted in FIG. 3(*e*). Separate processes are required as the format of data maintained in the DBOR 230 differs from the format of data input from the external sources, and from the format of data in extracts for distribution. Thus, to perform meaningful audits and ensure data integrity and synchronization, the DBOR update process depicted in FIG. 3(*d*) requires invocation of the Inventory manager process 516 and DBOR manager process 520. When extracting data from the DBOR to the various SA agents (DM clients), invocation of Environment manager process 530 and DBOR manager process 520 is required, as depicted in FIG. 3(*e*). Thus, implementation of these separate processes allows audits of the DBOR with input systems data, and audits of the DBOR with extracted data that is being or has been distributed to Data Management.

As a fifth major service, the SA component 500 is responsible for activating services that are successfully deployed to service nodes, i.e., making the data, SLP or SIBB available for Service processing. The requirements pertaining to SA service/data activations and the handling required when errors occur include the following: 1) ensuring that all distribution dependencies (defined in the MOCE/SCE 228) are complete prior to allowing activation of SLPs, SIBBs or data. An example of a dependency may be that an SLP requires use of a specific database. The SA thus ensures that the database has been distributed and activated prior to allowing activation of the SLP; 2) checking the status of the distribution to its designated repositories prior to activation of an SLP, SIBB or data entity; 3) determining, based on distribution status, dependencies, completion status and predefined distribution rules whether the data previously distributed can be activated at all locations which successfully received the distribution. If SA determines that the data distributed may be activated, SA will attempt to send an activation request to Data Management; 4) checking the status of a designated repository (by querying the NGIN NOS) prior to sending activation requests; 5) attempting the activation on all designated repositories reporting an on-line indication, and, if a designated repository is reporting an off-line indication, storing the activation request for that repository for future forwarding and not attempt the activation on that repository. If a designated repository reports an on-line indication and for some reason is unable to process the activation request, SA retries the activation to that repository. If after a predefined, configurable number of retries the designated repository is unable to process the activation request, SA generates an alarm and stores the pending activation. Once an on-line indication is received from a designated repository that was previously off-line, Service Administration forwards all pending distributions and activations to that repository; and 6) receiving activation responses from Data Management. If an activation request indicates a success on all designated repositories, SA registers the system unique name of the data, SIBB or SLP and the physical locations of the information with the NOS. It should be understood that the physical location name includes an identification of the hardware component name.

In the preferred embodiment, SA determines, based on predefined distribution rules and the activation responses received from Data Management 600, whether the data has been activated at enough locations to make it available to service control managed objects. If Service Administration determines that the data may be made available to service control, SA registers the system unique data name and physical data locations of all successful distribution and activation locations with the NOS. If the data activated is to replace existing data in the network, SA ensures a smooth transition process of completing existing service processing on the old data while initiating new service processing on the new data. The old data becomes deactivated once all service processing completes on it, as will be explained in greater detail herein.

More specifically, as part of the service/data activation step, SA implements a trigger which causes the downloading of the service profile at the appropriate time. When a service profile (e.g., as shown in Table 2) is downloaded to a service node, the service profile includes the service start and end times. The service profile is downloaded to the service node by provisioning the information into Data Management, as will be described in further detail with respect to FIG. 3(*f*). The NOS, acting as a DM Client, is notified of the change in service profile information via the DM API. In a preferred embodiment, SA sends a message to a NOS Name Translation ("NT") function in each SLEE on which the service will execute to direct a name translation function to re-point the logical name for the service to the physical address or object reference of the version that is being activated.

Finally, the SA tracks repository platform characteristics to ensure that when data, SIBBs or SLPs are activated, they work on the appropriate platform; updates the status of the data, SIBB or SLP based on an activation or deactivation; and, logs all activations of data, SLPs and SIBBs with the monitoring logic component 540 (FIG. 3(*c*)).

Figure 3F:
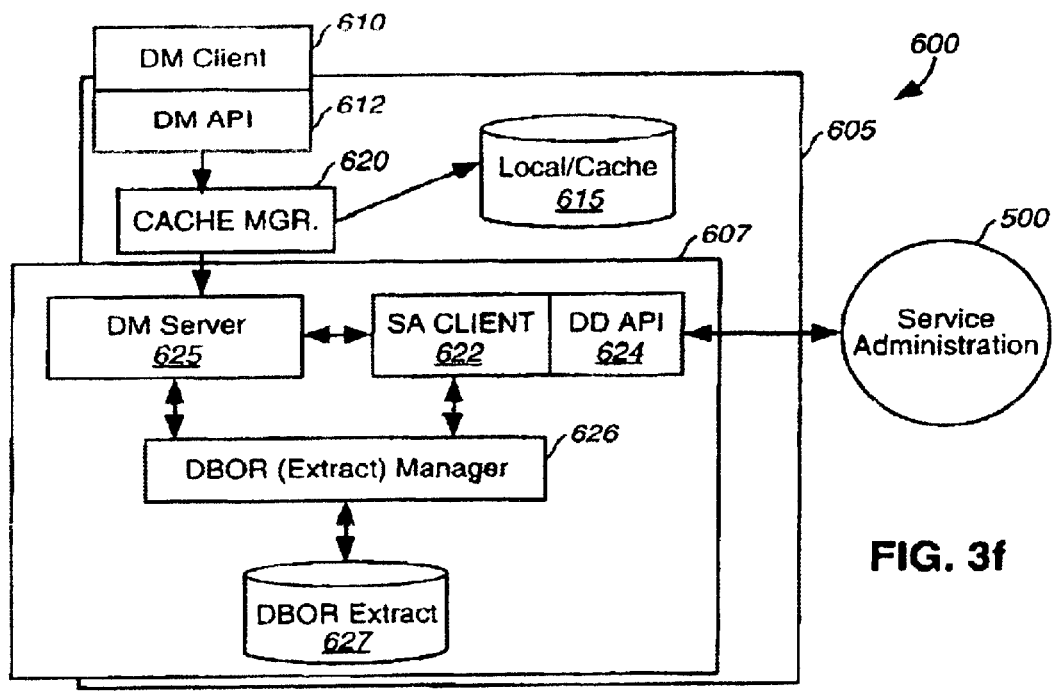
FIG. 3(f) illustrates the functional architecture of the Data Management component 600.
Figure 3H:
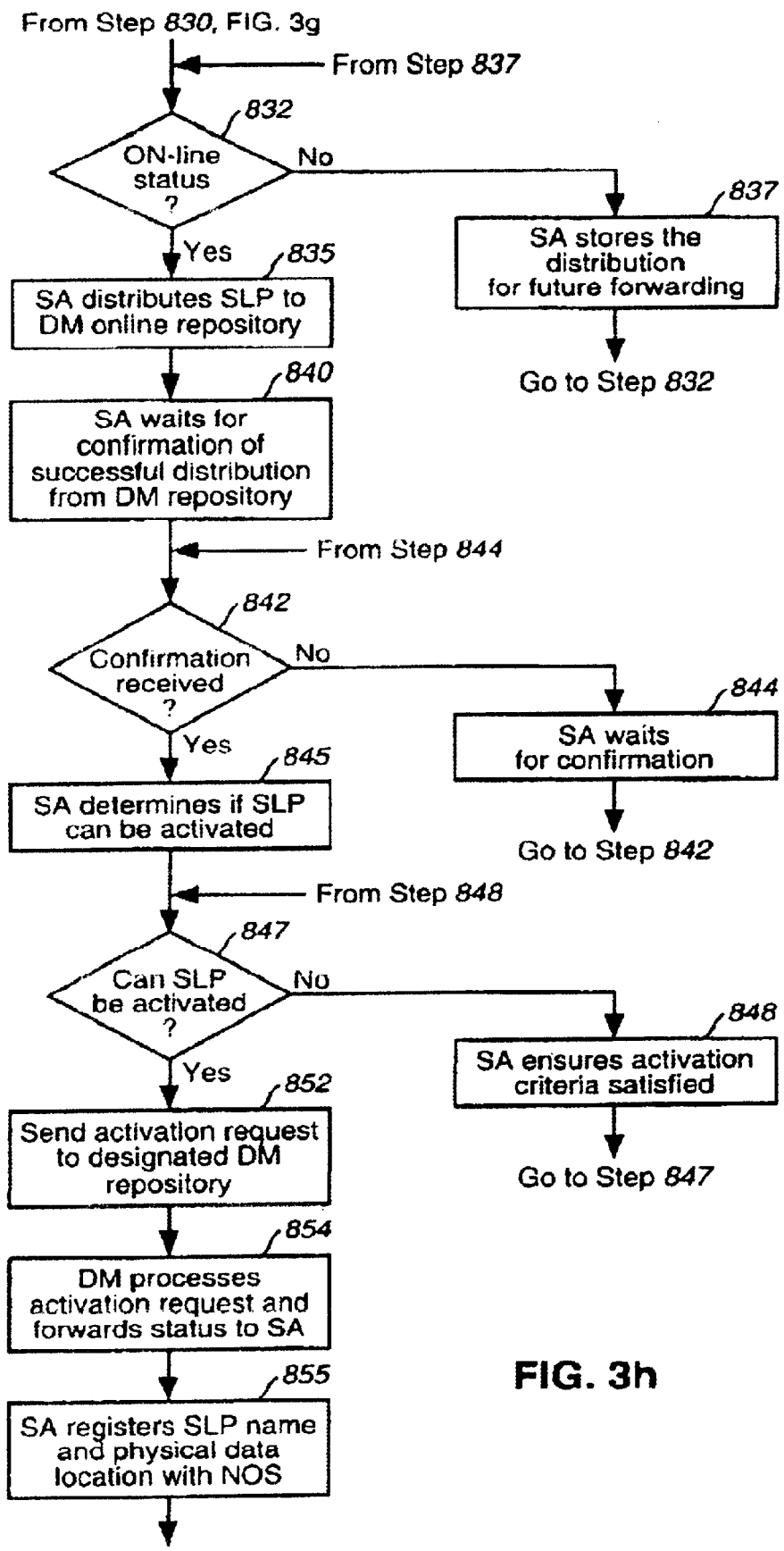

According to this fifth SA function, an explanation of how the IDNA/NGIN system handles service construction and deployment phases, is now provided with reference to FIGS. 3(g) and 3(h) which illustrate a scenario of steps in constructing and deploying an SLP for the IDNA/NGIN system, e.g., for a 1-800 Collect ("1-800-C") service. As indicated at step 812 in FIG. 3(g), the MOCE/SCE application program enables the user to access from SA all of the SIBB, SLP, data and other building blocks that are necessary for the creation of the 1-800-C SLP. In the example context of 1-800-C service, such building blocks may include: a play audio building block, a collect digits building block and a voice recognition building block. Copies of these appropriate building blocks are pulled from the global DBOR 230 buy SA into the MOCE/SCE to provide the foundation for developing the 1-800-C Service Logic Program, as indicated at step 814, FIG. 3(g). Then, as indicated at step 819, the 1-800-C Service Logic Program and all associated data such as voice files are unit tested within the MOCE/SCE environment. Next, as indicated at step 820, the 1-800-C Service Logic Program will execute correctly once distributed in the network. Then, as indicated at step 823, the 1-800-C Service Logic Program is submitted to the Service whether the 1-800-C SLP can be activated at all repositories where the distribution was successfully received.

As described herein, the Service Administration component allows the introduction of rules governing data and information distribution, data activation and data removal. Thus, as indicated at step 826, the SA component checks the rules that specify the Data Management repositories that are to receive the Service Logic Program and, the rules regarding the minimum number of repositories that must receive the distribution prior to allowing activation of the 1-800-C SLP. To do this, as indicated at step 830, Service Administration checks the status of the Data Management repositories by accessing the NOS Network Resource Management function, as described generally herein and in greater detail in U.S. Pat. No. 6,425,005 entitled METHOD AND APPARATUS FOR MANAGING RESOURCES IN AN INTELLIGENT NETWORK. Then, as shown at step 832, FIG. 3(h), the Service Administration component determines those DM repositories indicating "On-line" status, and, at step 835, distributes the 1-800-C SLP to all the DM repositories that are on-line. For those repositories reporting an off-line status, Service Administration stores the distribution for future forwarding to the off-line repository, as indicated at step 837. Then, as indicated at step 840, the Service Administration component waits until Data Management returns a status for each repository indicating the success or failure of the distribution. A determination is made at step 842 to determine whether the confirmation has been received from the respective DM repository. If the confirmation is not received, the SA waits for the confirmation as indicated at step 844. Once the confirmation is received, the process continues to step 845 where a determination is made by Service Administration as to whether the 1-800-C SLP can be activated at all repositories where the distribution was successfully received.

Particularly, Service Administration makes the determination of whether the 1-800-C SLP may be activated based on the combination of the following activation criteria: 1) the distribution status, 2) the data dependency status and 3) predefined rules. This is because Service Administration 500 performs the function of ensuring that all data dependencies of the service logic program are completed; i.e., distributed and activated, prior to allowing activation of an SLP dependent on such data. Thus, in the example context, if the 1-800-C SLP uses another Service Logic Program (e.g., an interface SLP to a Line Information Data Base) during its execution, Service Administration ensures that the other SLP or database has been distributed and activated prior to allowing activation of the 1-800-C SLP. It should be understood that some services may be activated even if all designated repositories do not receive the distribution of the Service Logic Program. This is dependent on several factors including: the expected call volume, and the quality of service, as specified in the distribution and activation rules in SA. For example, it may be sufficient for a particular low-call volume service to only be stored on two DM repositories in the network prior to being activated while others require that the service be located on all designated repositories before it can be activated to receive traffic.

Thus, in FIG. 3(h), step 847, a determination is then made based on the satisfaction of the activation criteria. If the SLP can not be activated, SA will wait until the SLP activation criteria are satisfied, as indicated at step 848. Otherwise, as indicated at step 852, SA sends an activation request to all designated Data Management repositories. Then, as indicated at step 854, Data Management processes the activation request and forwards an activation response for each repository to Service Administration indicating the success or failure of the activation. Based on the successful activation responses received from Data Management, Service Administration registers the 1-800-C SLP system unique name and physical data locations with NOS, as indicated at step 855, and, in the example context, the 1-800-C Service is now available for utilization. Any data repositories that were unable to receive the distribution and/or activation of the 1-800-C SLP are not registered with the NOS as a valid physical data location for this Service Logic Program.

As a sixth major service, just as the SA enables the distribution and activation of service components, the SA component 500 provides for the decommissioning and removing of service components from service nodes. The major steps involved are planning, de-activation, de-installation and/or de-commissioning of its associated parts, and the testing for adverse consequences. For example, after a period of service inactivity, or as specified by a user, when a service is no longer needed at a particular node, service administration will remove, i.e., de-activate the service, typically by sending a message to NOS NT enables removal of a service from IDNA/NGIN service nodes by sending a message to the local Data Management component to delete that service. The requirements pertaining to the SA function of deactivation and removal of services/data include: 1) enabling an authorized user to request deactivation of an SLP, SIBB or data entity and to specify a time for a deactivation; 2) checking the status and data dependencies of the SLP, SIBB, or data prior to forwarding a deactivation request to Data Management. If the SLP, SIBB or data status is active and no data dependencies exist, SA de-registers the SLP, SIBB or data with the NOS upon reaching the specified time rendering the SLP, SIBB or data as no longer available for Service Processing; 3) upon completion of the name de-registration with the NOS, forwarding a deactivation request of the specific SLP, SIBB or data item to Data Management. If the SLP, SIBB or data status is not active or if data dependencies exist, SA ignores the deactivation request and notifies the requester; 4) logging all deactivations of data, SLPs and SIBBs; 5) enabling an authorized user to request the removal of an SLP, SIBB or data entity and specifying a time for a removal; and 6) checking the status of the SLP, SIBB or data prior to forwarding a removal request to Data Management. If the status of the SLP, SIBB or data is deactivated, SA forwards the removal request to Data Management upon reaching the specified time. If the status of the SLP, SIBB or data is not deactivated, SA ignores the removal request and notifies the requester; and, 7) logging all removals of data, SLPs and SIBBs from Data Management.

As described above with respect to service/data activation, a trigger in SA 500 causes SA to download the command to remove the service profile from the service node at the appropriate time. This command is delivered to the service node by a command to Data Management 600. Data Management updates its tables, which results in NOS, acting as a DM Client, to receive notification of the service change.

FIG. 3(*i*) illustrates the service de-activation process with reference to the example of a provisioned 1-800 Collect SLP service. As shown in FIG. 3(*i*), the first step 860 involves the decision to withdraw the 1-800-C Service Logic Program and the utilization of the MOCE/SCE to test the impact of removing the 1-800-C Service Logic Program. Then, as indicated at step, 862, SA verifies the rules regarding the withdrawal of the 1-800-C Service Logic Program. Particularly, Service Administration checks to ensure that there are no dependencies of other active Service Logic Programs on the 1-800-C Service Logic Program. If dependencies do exist, further investigation is required to determine if the dependent Service Logic Programs are truly necessary and the planning step is repeated. If no dependencies exist, Service Administration will allow an authorized user to specify a time for the deactivation. Once it is determined that the SLP can be withdrawn, SA sends a deactivation request to all Data Management repositories containing the 1-800-C SLP, as indicated at step 865. Data Management processes the deactivation request, as indicated at step 867 and sends a deactivation response to SA indicating the success or failure of the deactivation. Upon a successful deactivation of the 1-800-C SLP, SA de-registers the 1-800-C SLP with the NOS, as indicated at step 868, to ensure that the 1-800-C SLP is no longer available for service processing. Future service requests will thus not be able to use the 1-800-C SLP. Then, as indicated at step 869, SA allows an authorized agent to specify a time for removing all the 1-800-C SLPs from all Data Management repositories where they reside. Once the specified time arrives, SA sends a removal request to all Data Management repositories containing the 1-800-C SLP, and, as indicated at step 870, Data Management deletes the 1-800-C Service Logic Program from its repositories, rendering the 1-800-C service no longer available.

As a seventh major service, the SA component 500 is responsible for performing audits. Before a service or data entity is entered into the DBOR, Service Administration audits that entity with other service/data entities already in use, to ensure no conflicts exist. Likewise, before a service/data entity is distributed to service nodes, it is audited to ensure no conflicts exist. Service administration provides both process-triggered audits and schedule-triggered audits of both services and data in the DBOR 230 that is deployed to service nodes. A process triggered audit is an audit which is initiated as a result of an unexpected failure. For example, if SA tries to download a service profile and the download is rejected because the profile already exists, SA initiates an audit to determine what to do. For example, SA compares the service which already exists against the one that is supposed to be downloaded to determine if they are the same, or different. If they are the same, the audit might stop there. If they are different, the audit process initiates a delete of the existing profile and then downloads the correct one. Schedule-triggered audits are triggered in accordance with a pre-defined schedule, or in accordance with programmed rules that launch auditing routines during system idle time, or on-demand by a user. These SA audit rules are kept as compiled code in the SA system 500, and as interpreted rules which are processed inside the SA system.

Referring now to FIG. 3(*f*), there is shown the Data Management component 600 of the SA component that provides local data storage and management functions for each IDNA/NGIN service node. Particularly, Data Management stores data received from Service Administration in one or more databases, and makes services/data readily available for Service Control environment by caching the needed data to memory resident in the Service Control computers, or on a co-located database server so the services/data may be provided to a Service Control service with minimal latency. More generally, the Data Management component 600 performs the real-time storage, replication, synchronization, and availability of data whether received from Service Administration or received as a result of service processing. These Data Management functions may be further categorized as: 1) a Data Repository function; 2) a Data Manipulation function; 3) a Data Utility function; and 4) a Billing Record Generation function.

Data Repository Function

The Data Repository function comprises all specific functionality required for the storage of IDNA/NGIN data. Generally, a repository is a physical device that stores all different types of information; e.g., voice files, objects, SLPS, SIBBs, and databases. In the administration of the data repositories, Data Management functionality takes into account security, fault and configuration management of repositories.

The repository storage aspect of Data Management includes the ability to: 1) store persistent data, SIBBs, SLPs, audio files, call context data, schedule data, configuration data, name service data, text files, e.g., faxes; 2) retain specified data for a configurable period of time, e.g., call context data may be stored for a couple of days before deletion from the repositories; 3) automatically delete the specified data from its repositories upon expiration of the retention period; and, 4) provide support for multiple versions of repository data.

As part of the storage function, Data Management 600 may check the status of its repositories to ensure that queries and distributions are only made to on-line repositories. Thus, if a repository is taken off-line, queries and distributions will not be attempted on that repository. As part of this function, Data Management may: query the status of repositories, e.g., ascertain a utilization status which provides an indication of how busy each repository is in terms of the number of transactions its currently processing; forward the repository status information to NOS 700 at initialization, and as status changes occur; provide an alarm if a repository is taken off-line or is non-functional; and, notify the NOS 700 that no further queries or updates should be sent to a repository reporting an off-line indication.

Furthermore, as part of the storage function, Data Management provides for configuration management, fault management, and log management of the data repositories. The DM function pertaining to configuration management enabling an authorized user to: define and extend the schema of the data repositories; query and modify system resources allocated for a repository; and, query and modify a repository's indexing strategies. The DM function pertaining to fault detection and report generation for the maintenance of data repositories includes: enabling the definition of fault thresholds and notifications for the system resources allocated to a repository; enabling the detection and reporting of media failures within a repository; enabling the definition of fault thresholds and notifications for the percent full of a repository's capacity; enabling the definition of fault thresholds and notifications for the percent full of a repository's log; and, providing a notification of when a repository or one of its components (e.g., schema, repository data) is corrupted. The DM functions pertaining to the establishment and management of logs on the repositories owned by Data Management include: the ability to log capabilities on repositories, including the following types of logs: (a) Transaction logs; (b) Error logs; and, (c) Event logs, and to save these logs on an external medium. With respect to the logging function, Data Management may retain log data for a configurable period of time before reinitializing the log. Additionally, an authorized user may query and modify characteristics (e.g., size, field descriptions, event reporting) of logs on a repository, and, specify the data that is to be written to each log. For example, due to the volume of transactions, a user may only want to capture "write" transactions in the transaction log versus all transactions.

DM Manipulation Function

The Data Manipulation function of DM comprises all specific functionality required for receiving distributions of data, replicating data across repositories, querying, retrieving, and updating data in repositories, initiating abort and roll back transactions, and performing data audits. This functionality may be broken down into the following areas: a) Data Distribution; b) Data Replication; c) Data Retrieval and Update; d)Data Transactions; and, e) Data Audits, each of which is described herein.

Data Distribution

Data Distribution as defined herein refers to the disbursement of data or services from Service Administration to the Data Management 600. With respect to the Data Distribution function, DM receives data distributions from Service Administration; reports on the state of data deployed in the system; makes data available for use by services; and, deactivates and removes data stored by Data Management.

Particularly, as embodied by the data server, DDAPI, DBOR extract repository and DBOR extract manager components (FIG. 3(f)) of DM 600, Data Management is enabled to receive distributions of data, file definitions, SLPs and SIBBs from Service Administration. If the capacity of the repository has been exceeded, any further attempts to receive data distributions will fail however, without blocking access to data in the repository. In response to a distribution of data to DM from SA, processes running in the DM server respond to SA with a signal indicating success or failure of the distribution. If there is a data distribution failure, DM may undo any portion of the distribution that was completed. As described, an activation request signal is distributed from SA to indicate that data has been successfully distributed to a minimum number of repositories and is to be made "active" for Service processing. Data Management responds to receipt of an activation request with an activation response indicating success or failure, which is sent back to Service Administration upon a respective successful/unsuccessful activation of the data, SIBB or SLP. The DM is also able to receive and process a deactivation request from Service Administration which is sent from SA to make a specific data, SLP or SIBB unavailable for Service processing. Data Management responds to a deactivation request with a deactivation response indicating the success or failure of the requested deactivation to Service Administration.

Likewise, the DM is additionally able to receive and process a removal request signal from Service Administration which specifies that DM is to remove specific data from the designated repository. DM sends a removal response indicating the success or failure of a removal request back to Service Administration. It should be understood that activation, deactivation, and removal requests may be for an SLP, SIBB or a data entity.

Data Replication

The Data Replication function of DM includes all specific functionality required for replicating data to specific locations, i.e., service node data repositories, i.e., local server caches, and to notify the NOS of successful/unsuccessful replications. The IDNA/NGIN system replicates data based on defined replication policies provided by SA configuration files. As described herein, the term "replication" refers to the act of copying data from one repository to another for data written as part of service processing.

For example, Data Management replicates data to other repositories when data is updated during Service Processing. First, Data Management determines a set of locations where data is to be replicated based on established replication rules provided by SA in configuration files for the data entity and, ensures that attempts to replicate repository data when the capacity of the targeted repository has been exceeded will fail without blocking access to existing data in the repository. If the replication fails due to excessive capacity, Data Management notifies the NOS component that the specific data is not available at this repository to ensure that no further attempt to retry the replication to that repository is performed. If a replication to a repository fails for reasons other than capacity, Data Management may retry the failed replication on the repository. If after a predefined, configurable number of retries, the repository is still unable to receive the replication, Data Management generates an alarm and notifies the NNOS component that the specific data being replicated is unavailable at this repository. This ensures that no queries are done on this data at this location. A synchronization utility may thus be implemented to get the repositories back in synchronization.

Data Retrieval and Update

The Data Retrieval and Update functionality includes the ability to access data stored by Data Management during service processing.

In the preferred embodiment, at any particular service node, Data Management receives data requests from an executing managed object instance in the SLEE, e.g., through the NOS, during service processing. Data Management specifically notifies the requester (e.g., managed object) if it is unable to understand the data request. If the data request is for the retrieval of a data entity, Data Management returns the requested data to the requester (e.g., via NOS). It should be understood that any support that is needed for manipulating and querying data in a single repository or across multiple repositories is provided by DM. Data Management additionally supports the collection and collation of the results of queries that span multiple repositories. If DM is unable to locate the name of the requested entity in the data retrieval request, DM notifies the NOS component. The NOS component will also be notified if a database failure occurs during the retrieval of a data entity. Data Management additionally notifies the requester (executing service control object) of the inability to retrieve a specific data entity from a valid name. If the data request is for an update of a data entity, Data Management updates the data entity and determines if replication is required. DM notifies the requester if it is unable to update a data entity specified in a data request, and additionally notifies NOS if it is unable to locate the name of the requested entity in the data update request. At any time during NGIN operation, DM notifies the NOS of a database failure during the update of a data entity. If the data request is for the deletion of a data entity, DM deletes the data item and determines if the transaction needs to be initiated on other repositories.

Data Transactions

A transaction is defined as a sequence of operations on a set of data that transforms the data from one consistent state to another consistent state. Examples of transaction include: entering data, updating existing data, deleting data, and copying data. In the context of the IDNA/NGIN system, DM is able to initiate a transaction on a repository, abort a transaction that has been initiated, provide notification if a transaction failure occurs, and, log all transaction failures. Data Management additionally implements a recovery strategy by returning the data controlled by a transaction to its previous state as a result of a transaction failure, and re-execute a failed transaction as a result of a transaction failure. Any recovery strategy implemented may be defined at the time of initiating a transaction, or, when the failure occurs.

Data Management is further provisioned to enable a transaction to time-out and hence fail, according to a predetermined time-out parameter specified at the time of initiating a transaction. Further data transaction functionality includes: the capability to participate in multiple transactions at a time; the provision of transaction concurrency resolution mechanisms that support blocking of concurrency collisions with queuing of pending transactions; the generation of an indication signal if any of the transaction data gets modified outside of the context of the transaction (i.e., is corrupted); the capability to roll back the state of its data while participating in a transaction; and, the capability to roll back all operations performed while participating in a transaction.

Data Auditing

The Data Auditing functionality of the IDNA/NGIN system includes the provision of an audit/recovery environment for repository data. In the context of the Data Management, an "audit" is the process of testing synchronization between two or more copies of repository data and reporting the results. "Recovery" is the set of actions taken as a result of an audit to bring the copies into synchronization. As described herein, all data that is made persistent and/or replicated may be audited. Additionally, it is assumed that a primary copy model is established and considered to be correct for the purposes of audit and recovery. Data Management thus is able to designate the primary copy of a repository. In the context of NGIN, DM is further enabled to audit data across multiple repositories, log all audit discrepancies, provide a notification of audit discrepancies, and, provide automatic recovery based on a defined set of rules related to an identified discrepancy. In the preferred embodiment, Data Management may schedule data audits.

Data Utility Function

In the context of the IDNA/NGIN system, data utility refers to functionality required to shutdown and initialize a repository, backup stored data, recover data following a catastrophic event, synchronize data between repositories, and, monitor and maintain data repositories. Data Management is additionally enabled to shutdown (take off-line) a repository for maintenance or recovery purposes. In determining whether to shutdown a repository, a mechanism is provided for monitoring the percent utilization of a data repository. Utilities are thus provided that allows an authorized user to maintain the data repositories, including a utility for optimizing disk space and for cleaning up of logs. Data Management may additionally backup and restore a repository using the local operating system's file commands. A repository may be recovered without loss of information.

Data Management is provided with an additional utility for archiving repository data to an external medium; synchronizing repository data across multiple repositories; synchronizing a subset of data (partial synchronization) across multiple repositories, and, bringing a repository on-line.

Billing Record Generation Requirements

Billing Record Generation functionality for the NGIN system includes the gathering of network events, formatting the network events into the appropriate (call history) records, transmitting the formatted records to the appropriate location, and identifying potentially fraudulent calls. As the Billing Record Generation function is responsible for formatting and transmitting the information that will be used to bill customers for services, its accuracy is certified.

Gathering Network Events

Raw network events used for billing purposes are gathered from Data Management's repositories and are reviewed to verify their completeness. In the creation of call history records utilized by the various types of downstream billing systems, a unique network identifier is provided for each call history record so that the records may be subsequently manipulated for further processing. In the preferred embodiment, call history records may be used to capture information used for the generation the following types of records: call detail records (CDRs) which capture network event information on shared lines; private network records (PNRs) which capture event information on private lines (e.g., VNET); operator service records (OSRs) used to capture information when shared lines are used for operator services; and, private operator service records (POSRs) which capture information when private lines are used for operator services. Preferably, each of the foregoing types of billing records may be expanded. Thus, expanded call detail records (ECDRs), expanded private network records (EPNRs), expanded operator service records (EOSRs), and, expanded private operator service records (EPOSRs) may be generated. Additional records that may be generated through DM include switch event records (SERs) which identify a switch event (e.g., system recovery, time change) and billing data records (BDRs). This function additionally includes storing call history records on a long term storage and retrieval medium (e.g., tape).

Transmit Call History Records Requirements

After each of these call history records are generated, they are transmitted to the appropriate downstream system. For example, in the preferred embodiment, all CDRs, PNRs, OSRs, POSRs, their corresponding expanded versions ECDRs, EPNRs, EOSRS, EPOSRs, and SERs and, BDRs are sent to a system Storage and Verification Element "SAVE" (not shown) for eventual distribution to a Network Information Concentrator (NIC). A DM system function provides a verification that SAVE had successfully received each of these call history records.

Identify Potentially Fraudulent Calls

The NGIN system has a built in mechanism for identifying potentially fraudulent calls. Thus, DM component 600 provides the ability to monitor the network usage for fraud, and report suspected fraud to an appropriate Fraud Detection system. As an example, the Billing Record Generation function: 1) obtains profiles from a Fraud Detection system (not shown) to identify network events that should be sent to Fraud Detection; 2) evaluates network events against the fraud profiles; and 3) transmits potentially fraudulent calls to a Fraud Detection system in real-time.

FIG. 3(f) illustrates generally, the functional architecture of the Data Management component 600 which comprises: a service control server component 605 for making the call service data available at the service node for real-time call processing; and, a database component 607, embodied as a discrete database server, for storing and distributing the selected subset of data maintained by SA. Specifically, the service control server component 605 includes a Data Management (DM) Client 610, which is the actual data management application; a DM API 612 which is linked with the DM application and is the interface the DM application uses to obtain data from SA; local cache 615 which is a shared memory on a service control server used to store some or all data from the DBOR Extract available for call processing in accordance with a local caching strategy, and a Cache Manager 620, which maintains the state of the local cache by implementing a local caching strategy and, communicates with the DM server to retrieve data from the DBOR extract. The database component 607 includes a DBOR Extract 627 which comprises one or more databases having data to be used by managed object instances during service execution at that node; a DBOR Extract Manager 626 that performs the same functions as the DBOR Manager 520 in Service Administration (FIG. 3(d)), but handles a selected subset of the information that SA holds; an SA client 622, which inputs data received from service administration to the DBOR Extract Manager 626; a DDAPI 624 that is the process interface between the SA client 622 and the data distribution process of SA; and, a data management server 625, that generally handles data extracts from the DBOR Extract Manager 626.

The data management operation will now be described in further detail with respect to FIG. 3(f). Within a SLEE, several types of functions may need data from Data Management 600 including, but not limited to managed objects (SIBBs, SLPs, etc.) and NOS. Each of these is represented in FIG. 3(f) as a DM Client, which executes in the service control SLEE. A DM Client 610 uses the DM API 612 to make a request for data as the DM API 612 provides a common message set for all DM Clients to interface with Data Management. The DM API 612 also encapsulates from the DM Client the specific location where the data is needed, as this data may be stored in a Local Cache 615 or only in the DBOR Extract 627. The DM Client 610 requests to data by a logical name, and the DM API 612 determines if that data can be retrieved from the local cache or, if it needs to request the data from the DBOR extract via the DM Server. Preferably, the local cache 615 is a shared cache available for every process running on each SLEE provided in the control server 605, i.e., there may be one or more local caches provided for different applications, e.g., 1-800 process cache, routing manager cache, etc., with each shared cache having its own respective cache manager.

When a DM Client 610 makes a request for data, the DM API first checks the local cache 615 to see if the requested data is stored there. If the requested data is stored in the local cache 615, the DM API retrieves the requested data and provides it to the DM Client 610 using any standard data retrieval technique, such as hashing keys and algorithms, or indexed sequential access methods.

If the requested data is not stored in the local cache 615 the associated Cache Manager 620 retrieves the data from the DBOR Extract 627, via the DM Server 625. Particularly, the DM API 612 notifies the Cache Manager 620 that it needs certain data and the Cache Manager responds by sending a request to the DM Server 625. The DM Server 625, in turn, retrieves the requested data from the DBOR Extract, using the DBOR Extract Manager 626 for database access. The DM Server 625 sends the requested data back to the Cache Manager 620, and the Cache Manager provides the data to the DM Client 610 via the DM API 612. The Cache Manager may also write the requested data to the local cache 615, depending upon the local caching strategy which is dependent on both service demands and on the capabilities of the computers they run on, notably the memory capacity. These specifications are obtained from the service and computer profiles generated by Service Administration.

In the preferred embodiment, data cache manager component for the DM 600 of IDNA/NGIN employs a 'Client Side Caching' strategy at each service node. In accordance with this strategy, cache manager routines and logic is implemented essentially in the following manner: 1) the local cache is maintained as a static array in the beginning of the routine; 2) the routine first checks to see if the requested data is in the local cache; 3) if the data is in the local cache, it is formatted and returned to the caller; 4) if the data is not in the local cache, the data is retrieved from the Data Server using a common "QueryServer" routine; and, 5) when data is returned from the Data Server, it is stored in the cache, formatted, and then returned to the caller. More particularly, the "QueryServer" routine formats a query to the Data Server, sends the request, and if it does not receive a response it sends another request. This continues until either a response is received, or until a set number of attempts, at which time the routine will return with an error.

In the preferred embodiment, the code logic exists in a separate process called the 'cache manager' which allocates the cache space dynamically and not as a 'static variable'. Furthermore, in the preferred embodiment, the cache manager is a generic routine, i.e., it does not contain references to specific tables and data elements. Moreover, the cache manager of the preferred embodiment implements logic to handle many caching strategies and, implements logic for handling unsolicited data messages from the data server.

Local caching strategies range from storing all data in the Local Cache, to storing nothing but, typically includes a "most recently used" or "most frequently used" strategy. As provisioning of a local cache is to provide quick data retrieval (using shared memory) for frequently used services, the local caching strategy is closely tied to the SA service support provisioning function which determines which services to run on which Service Control Servers. More particularly, there are three levels of data caching in the system dependent upon the data characteristics and services that the data is associated with: 1) local level data which implements local caching scheme described herein utilizing the DMAPI, Cache Manager and DM server and DBOR extract devices; 2) node or site level data where the DMAPI, Cache Manager and DM server components are implemented for updating the DBOR and sending the change back through the DM server to all of the cache managers at the node; and, 3) network level data where the DMAPI, Cache Manager and DM server components are implemented to send the data up to SA and applied to the central database and down back through SA and all of the DM servers to all of the local caches in the network. It should be understood that there are also two levels of data permanency: 1) permanent data intended to be written into the DBOR; and, 2) transient data to be written to local caches depending upon the characteristics of the data.

As further shown in FIG. 3(f), as an example of local data caching of transient data, when an SLP for a service is to run actively, i.e., be instantiated as a persistent object in the SLEE based on anticipated service demand, the local caching strategy specifies storage of data for this service in the Local Cache for the specified duration of time in accordance with the configuration file, i.e., a service profile, from SA.

The DM Server sends the data for that service to the Cache Manager 620 for storing the local cache 615 for the active time. Particularly, when a SLEE environment becomes provisioned, the Cache Manager 620 registers itself with the DM Server 625 by specifying which services will be performed. Based on this, the DM Server 625 retrieves from the DBOR Extract 627 and downloads to the Cache Manager 620 the data needed to fulfill the local caching strategy for the services for which the Cache Manager has registered. Preferably, the DM Server 625 knows the local caching strategy for each local cache and the cache manager at its site. Thus, the DM Server 625 may also provide unsolicited data to the Cache Manager. For example, when a network initiated update occurs, the update may be directed by the DM server directly into its DBOR extract and/or to service administration for validation and distribution to other data management platforms. If the DM Server receives from SA an update, it will send this update to the cache manager for updating the local cache. It should be understood that in this instance, the SA Client and DBOR Extract Manager 626 will update the DBOR Extract. Data Management provides a process interface between the SA Client and DM Server, for notifying the DM Server of DBOR Extract updates.

In the preferred physical embodiment, the Data Management component 600 uses commercial database products, most of which provide an interface mechanism such as an API, object request broker, ("ORB") or network file service. As such, Data Management does not use NOS component 700, however, the Service Control interface to Data Management may be adapted to use NOS. Since the Data Management function is local to each service node, this function may be physically realized by different object and relational database systems/products throughout the network. Example relational database products include those available from Oracle, Informix, and Sybase, in addition to Versant Object Oriented Database products. The interface between Service Control and Data Management may be supported by whichever database system/product is used at a particular service node, and may be different at different nodes. The distributed processing that is enabled by NOS occurs among processes in the SLEE, with each process interfacing with its local Data Management component, using whatever interface is in place at the local node.

A few preferred embodiments have been described in detail hereinabove. It is to be understood that the scope of the invention also comprehends embodiments different from those described, yet within the scope of the claims.

For example, the general purpose computer is understood to be a computing device that is not made specifically for one type of application. The general purpose computer can be any computing device of any size that can perform the functions required to implement the invention.

An additional example is the "Java" programming language can be replaced with other equivalent programming languages that have similar characteristics and will perform similar functions as required to implement the invention.

While the present invention has been disclosed and discussed in connection with the above-described embodiment, it will be apparent to those skilled in the art that numerous changes, variations and modifications within the spirit and scope of the invention are possible. Accordingly, it is, therefore, intended that the following claims shall encompass such variation and modifications.

What is claimed is:

1. A service administration system for distributing service processing resources among one or more service nodes of an intelligent communications network, each service node providing services at a network resource associated with a service node, said system comprising:
   a device for receiving re-usable service components for providing services at a service node of said intelligent communications network, each said service component having an associated service profile defining service node resources required for storing, maintaining and executing said service;
   a device for receiving configuration criteria including physical resource capacity of each service node of said network;
   a database device for storing said received service components, said service node configuration criteria, and service profile associated with said service components;
   a distribution mechanism for distributing copies of said service components to one or more service nodes according to said service profile information associated with a service and a configuration criteria of said service nodes; and
   a trigger mechanism for automatically activating and deactivating said service component distributed to said service node, wherein utilization of service node resources are optimized by activating said service components at service nodes during periods of high demand for an associated service and deactivating service components at service nodes during periods of low demand for said service.

2. A method for administering service components to one or more service nodes comprising an intelligent network, each service node providing one or more services relating to an event received at a network resource associated with a service node, said method comprising:
   receiving re-usable service components for providing services at a service node of said intelligent network, each said service component having an associated service profile defining service node resources required for storing, maintaining and executing said service;
   receiving configuration criteria including physical resource capacity of each service node of said network;
   maintaining a database including master copies of said received service components, said service node configuration criteria, and service profile associated with said service components;
   distributing copies of said service components to one or more service nodes according to said service profile information associated with a service and a configuration criteria of said service nodes; and
   forwarding a trigger to said service node for automatically activating and deactivating a service component distributed to said service node, whereby a service component distributed to said service node is activated during periods of high demand for an associated service and deactivated at service nodes during periods of low demand for said service.

3. A service processing system for controlling a communications network having a plurality of service nodes, each service node comprising at least one logic execution environment that hosts managed objects, said service processing system comprising:

a data manager for maintaining at each service node a local storage of managed objects and data needed for service processing within the service node and monitoring operational status of the local storage at the service nodes; and at least one service administrator that controls the deployment and activation of services within said service processing system by distributing, from a global repository, managed objects and data to one or more data managers associated with said service nodes in said communications network.

4. A method for controlling the deployment and activation of services in a communications network having a plurality of service nodes, each service node comprising at least one logic execution environment that hosts managed objects, said method comprising:

maintaining at each of said service nodes a local data store of managed objects and data needed for service processing within the service node;

monitoring operational status of the local data store of the service nodes; and selectively distributing, from a global repository, managed objects and data to one or more of said local stores associated with said service nodes in said communications network, so as to control where and when services are deployed and activated in said communications network.

* * * * *